United States Patent
Tomlinson et al.

(10) Patent No.: US 11,212,082 B2
(45) Date of Patent: Dec. 28, 2021

(54) CIPHERTEXT BASED QUORUM CRYPTOSYSTEM

(71) Applicant: PQ Solutions Limited, London (GB)

(72) Inventors: Martin Tomlinson, Totnes (GB); Cen Jung Tjhai, London (GB)

(73) Assignee: PQ SOLUTIONS LIMITED, London (GB)

( * ) Notice: Subject to any disclaimer, the term of this patent is extended or adjusted under 35 U.S.C. 154(b) by 192 days.

(21) Appl. No.: 16/588,139

(22) Filed: Sep. 30, 2019

(65) Prior Publication Data

US 2021/0099290 A1 Apr. 1, 2021

(51) Int. Cl.
*H04L 29/06* (2006.01)
*H04L 9/08* (2006.01)
*H04L 9/14* (2006.01)

(52) U.S. Cl.
CPC .......... *H04L 9/0825* (2013.01); *H04L 9/0861* (2013.01); *H04L 9/14* (2013.01)

(58) Field of Classification Search
CPC ....... H04L 9/0825; H04L 9/14; H04L 9/0861; H04L 9/0891; H04L 9/3026; H04L 9/3093
See application file for complete search history.

(56) References Cited

U.S. PATENT DOCUMENTS

| | | | | |
|---|---|---|---|---|
| 5,625,692 | A * | 4/1997 | Herzberg | H04L 9/085 380/286 |
| 7,577,689 | B1 * | 8/2009 | Masinter | G06F 11/1464 |
| 8,077,863 | B2 * | 12/2011 | Hosaka | H04L 9/085 380/28 |
| 9,251,097 | B1 * | 2/2016 | Kumar | G06F 21/602 |
| 2004/0030932 | A1 * | 2/2004 | Juels | H04W 12/126 713/151 |
| 2008/0263363 | A1 * | 10/2008 | Jueneman | H04L 63/061 713/184 |
| 2009/0252330 | A1 * | 10/2009 | Patnala | H04L 9/0825 380/279 |
| 2010/0054458 | A1 * | 3/2010 | Schneider | H04L 9/14 380/28 |
| 2015/0378842 | A1 * | 12/2015 | Tomlinson | H04L 9/085 380/28 |

(Continued)

FOREIGN PATENT DOCUMENTS

| | | | | |
|---|---|---|---|---|
| JP | 2008234597 | A * | 10/2008 | H04L 9/0891 |
| WO | WO-2006124289 | A2 * | 11/2006 | H04L 9/085 |
| WO | WO-2016135726 | A1 * | 9/2016 | H04L 9/0656 |

*Primary Examiner* — John B King
(74) *Attorney, Agent, or Firm* — Butzel Long

(57) ABSTRACT

Methods are described for constructing a secret key by multiple participants from multiple ciphertexts such that any quorum combination of participants can decrypt their respective ciphertexts and so generate a fixed number of key fragments that can be combined by a recipient to generate the secret key. Worked examples are described showing how the encryption keys for the ciphertexts may be key wrapped using a key encapsulation mechanism for which ciphers that are resistant to attack by a quantum computer may be used. In these cases, a post-quantum quorum system is realised. Methods are described by which the quorum key fragment ciphertexts may be updated so that the original key fragments become invalid without necessitating any change to the secret key.

19 Claims, 19 Drawing Sheets

(56) References Cited

U.S. PATENT DOCUMENTS

| | | | | |
|---|---|---|---|---|
| 2015/0381350 A1* | 12/2015 | Joye | ............... | H04L 9/3218 |
| | | | | 380/30 |
| 2016/0154963 A1* | 6/2016 | Kumar | ............... | G06F 21/602 |
| | | | | 713/189 |
| 2016/0241391 A1* | 8/2016 | Fenster | ............... | H04L 9/085 |
| 2017/0093564 A1* | 3/2017 | Bernat | ............... | H04L 9/0822 |
| 2018/0054316 A1* | 2/2018 | Tomlinson | ............... | H04L 63/062 |
| 2019/0245681 A1* | 8/2019 | Alwen | ............... | H04L 9/0844 |
| 2019/0332792 A1* | 10/2019 | Kunii | ............... | G06F 21/62 |
| 2020/0204355 A1* | 6/2020 | Konrad-Mausser | ............... | |
| | | | | G06Q 20/3829 |

* cited by examiner

CIPHERTEXT BASED QUORUM CRYPTOSYSTEM

FIELD OF THE INVENTION

This invention relates to data processing, and more particularly to systems and methods for quorum-based data processing.

BACKGROUND OF THE INVENTION

There are a number of different cryptographic systems in common use that split an encryption key amongst key fragment holders in order to mitigate the risk of compromise of the encryption key. Usually a quorum of fragment holders need to use their private keys in order to provide information in order to regenerate the encryption key. There are advantages in basing the system on public key cryptography such as elliptic curve cryptography ECC, or RSA in that anyone can construct the ciphertext material without compromise to the private keys needed to decrypt the ciphertext material. Unfortunately, these current day systems will be breakable by quantum computers once these have been developed to the stage that they have an adequate number of available qu-bits.

SUMMARY OF THE INVENTION

One feature of the invention described below is that it has embodiments which are resistant to being broken by quantum computers.

The invention encrypts information using a key that is subsequently split with the key fragments held encrypted as ciphertexts. The ciphertexts may be distributed to fragment holders who use their private keys to decrypt the ciphertexts or distributed to one or more administrators to act as a quorum or serve as an intermediate stage distributing appropriate ciphertexts to fragment holders who have been nominated at a later stage. A quorum of ciphertexts is needed in order to regenerate the key so that the original information may be retrieved. Some embodiments feature public key cryptosystems that are resistant to being broken by a quantum computer. Embodiments of the invention are described below.

According to one aspect, the present invention provides a method or system for controlling access to stored encrypted data, wherein an encryption or decryption key is constructed or reconstructed from a predetermined, minimum number of ciphertexts. The number of ciphertexts, that are required to form a quorum is denoted by k. The system generates a plurality of ciphertexts from which an encryption or decryption key may be reconstructed. The total number of ciphertexts generated is usually equal to the total number of key fragment holders, denoted by n. Each ciphertext may be generated using the respective encryption key of each fragment holder but this does not have to be the case and ephemeral session keys may be employed. The fixed quorum number of ciphertexts required to reconstruct the key is k. The required quorum number k of ciphertexts is a smaller number than the total number of generated ciphertexts. The quorum ciphertexts can be any combination of k ciphertexts selected from all of the n.ciphertexts. In some embodiments key wrapping is used featuring a technique known as Key Encryption Mechanism KEM in which case a quorum of ciphertexts is formed from 2k ciphertexts. In the following, administrators or fragment holders with access to the ciphertexts, may be individuals controlling hardware or software or may be autonomous, equipment based entities.

The invention may be hardware based implemented for example as Hardware Security Modules (HSM's) or implemented in software running on servers, desktop computers, mobile devices or implemented by a combination of hardware and software in platforms such as cars, trains, aeroplanes, ships or satellites.

As well as encryption and decryption keys the invention may be used to generate quorum based passwords, authentication tokens or digital signatures. In the following the generic term, key, is used to denote such an encryption or decryption key, password, authentication token or digital signature key.

According to yet another aspect, the present invention is compliant with the trend in modern cryptography in which a system is constructed of secure, stand-alone modules whose security may be established or has been established by extensive testing, cryptanalysis and theoretical methods. This is in contrast to almost all other engineering or science based systems which are designed to be as integrated as possible to reduce cost and improve efficiency. In a cryptographic system the system security is determined by the security of the weakest component.

The encryption key is derived from a secret value that is usually derived randomly. The secret value is the value of a key polynomial for a specific instance of the polynomial variable, an index. Other values of the key polynomial for other specific, distinct instances of the polynomial variable, that is other indices, form secret shares, key fragments, which are encrypted as ciphertexts. The distinct instances of the polynomial variable need not be kept secret. The encryption of the key fragments may be by means of public key encryption using a public key cipher or by encryption using a symmetric key cipher. For a quorum size of k the key polynomial has degree k−1. The coefficients of the polynomial are usually chosen randomly but this does not have to be the case although the security of the quorum system relies on the coefficients being kept secret and not being guessable. Usually once the key fragment ciphertexts have been generated the key polynomial is deleted and no record of the polynomial is kept.

In the case of ciphertexts distributed to fragment holders, any fragment holder participating in a quorum is termed an active fragment holder. When a quorum of k active fragment holders is formed, each active fragment holder decrypts their respective ciphertext to retrieve their key fragment and multiplies this by a factor, a multiplicative constant, described below, to form a weighted key fragment. The secret value which may be the encryption key or a value from which the encryption key or decryption key may be derived is reconstructed by summing all k weighted key fragments together.

An identical key, or a set of keys, can be generated by different embodiments using a different number of fragment holders to form a quorum. One embodiment may be used to generate a key used for encryption and another embodiment may be used to generate the same key to be used for decryption. In these embodiments which generate identical keys, the key polynomials usually will be different as some coefficients are chosen randomly. The key polynomials can even have a different degree. This means that a different quorum size with a different number of fragment holders may be used to generate a key to be used for encryption compared to the size of quorum of fragment holders used to generate the same key to be used for decryption. This is in the case of the cipher being a symmetric key encryption cipher. It is possible for an embodiment to have a single fragment holder holding two or more key fragments with a single person or entity such as an HSM constructing or reconstructing the key.

In some embodiments, additional key material for use as encryption or decryption keys, authentication keys, or digital signature keys may be derived by additional application of a Key Derivation Function (KDF) using the reconstructed key as input.

The quorum key generation may be used to derive an encryption key for encrypting a document, general media or data file in order to produce an information data ciphertext. Subsequently the same quorum process may be used to derive the decryption key needed to decrypt the ciphertext back into the original document, general media or data file.

The fragment holders may comprise one or more of a computing device, an authentication token, a security dongle or interconnected hardware systems.

In further aspects, the present invention provides a system comprising means for performing the above methods. In yet other aspects, there is provided a computer program arranged to carry out the above methods when executed by a programmable device.

BRIEF DESCRIPTION OF THE DRAWINGS

There now follows, by way of example only, a detailed description of embodiments of the present invention, with references to the figures identified below.

DETAILED DESCRIPTION OF EMBODIMENTS OF THE INVENTION

Figure 1:
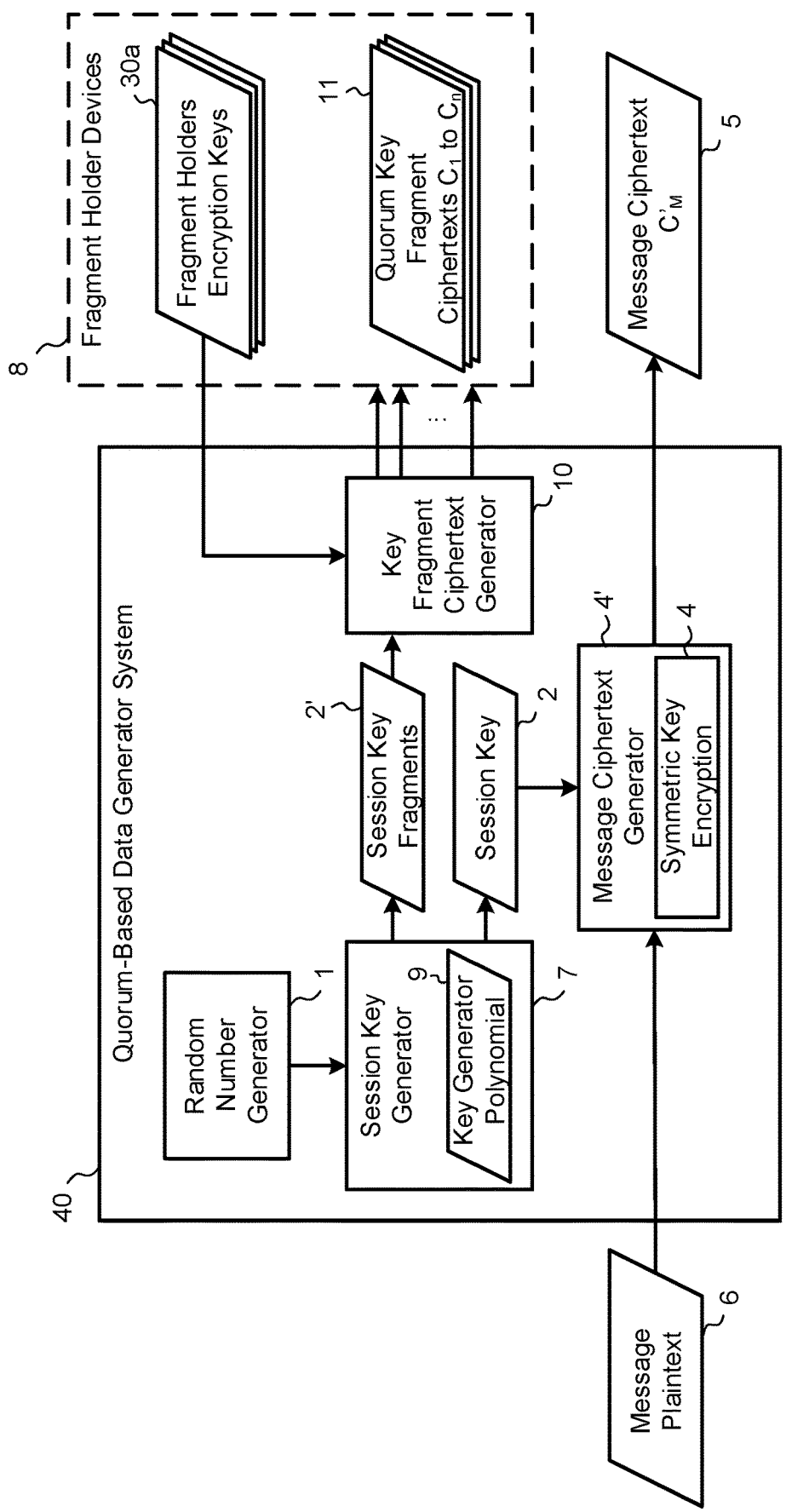
FIG. 1 is a block diagram showing the encryption of a message using a key defined by a key generator polynomial with random coefficients that is split into key fragments and retained as n ciphertexts.

Exemplary embodiments of the invention will now be described for systems and methods of implementing quorum-based data processing within a secured computing or hardware environment, where recovery of sensitive data, such as a secret key or a secure data file, is only possible when a predefined minimum number of associated quorum encrypted, weighted key fragments are received from a corresponding quorum of available authorised entities. It will be appreciated that the embodiments described herein are applicable to many types and forms of secured computing and hardware environments and data processes carried out therein. As one example, the secured computing environment may facilitate secured access to encrypted data by a quorum of authorised personnel, such as selected directors and/or employees of a corporate entity, by reconstructing a decryption key based on quorum weighted, key components received from a quorum of authorised personnel. As another example, the secured computing environment may facilitate controlled access to the original secure information data file, by decryption of a ciphertext encapsulating the original secret data based on quorum data received from a quorum of authorised personnel. As yet another example, the secured computing environment may facilitate access by a quorum of authenticated personnel to a product or service (e.g. a bank account, a secure web site), and/or a facility (e.g. via an electronic lock of a physical building, lab, vault, safe deposit box, critical infrastructure system, etc.). In such an example, the secret key would be used for authentication instead of decryption, where by coming together and providing the predetermined minimum number of quorum key fragments, the quorum participants can be authenticated to be allowed access to the secured assets. In further examples the secret key would be used for generating a digital signature, where by coming together and providing the predetermined minimum number of quorum key fragments, the quorum participants can sign off a commercial transaction or a block of transactions as in crypto currency applications.

In a set up stage which is similar for each embodiment, a number or symbol base is firstly defined, such as a prime or prime power field, or alternatives such as the set of rational numbers. It is advantageous to choose a prime field based on a prime number q with q being just less than a power of 2 for efficient computing. For example, there is a prime just under 256 bits long with the value of $q=2^{256}-189$. Another example at just under 128 bits long is the prime $q=2^{128}-159$. This prime is used in some of the worked examples detailed below. In an exemplary embodiment which is described by way of example the secret key is an ephemeral key chosen afresh for every instance of the quorum application. For example, where the key is used for encrypting an information file such as a document or a message, a new, distinct key and their associated quorum key fragments is generated for each document or message. This is a security advantage since any security break of any one quorum cannot be used to attack other quorum constructions.

FIG. 1 is a block flow diagram schematically illustrating functional and data components of a quorum-based data generator system 40 for generating a ciphertext message 5 from a plaintext message 6, using a secret key 2 that is computationally broken into encrypted quorum key fragments 2' for distribution to a plurality of fragment holder devices 8, according to an exemplary embodiment. The generic term "message" is used in the following to describe any type of digital representation of data, for example an information file or folder of files. The plaintext message 6 is encapsulated as a message ciphertext 5, denoted as $C'_M$, as shown in FIG. 1. A message ciphertext generator 4 encrypts the plaintext message 6 using a secret key. In this embodiment, the secret key is a session key 2, denoted as $K_s$, generated using a key generator polynomial 9, denoted as $f(x)$. The secret value of the session key $K_s$ is computed by a session key generator 7, as the value of the key polynomial $f(x)$ for a specific instance of the polynomial variable, an index $x_0$. The session key generator 7 also computes other values of the key polynomial $f(x)$ for other specific, distinct instances of the polynomial variable, that is other indices $x_1 \ldots x_n$, to form secret shares, referred to as session key fragments 2', which are each encrypted by a key fragment ciphertext generator 10 into respective key fragment ciphertexts 11, denoted as $C_1$ to $C_n$, using an encryption key 30a of a corresponding fragment holder 8. The quorum key fragments 2' may be encrypted using any known public encryption algorithm, for example based on a public key cipher or a symmetric key cipher.

The distinct instances of the polynomial variable need not be kept secret. For a quorum size of k, the key generator polynomial 9 has degree k−1. Preferably, the coefficients of the key generator polynomial are chosen randomly, for example using a random number generator 1. As those skilled in the art will appreciate, random coefficients may not be necessary where the quorum system is configured to ensure that the coefficients are kept secret and are not guessable. Once the quorum key fragment ciphertexts 11 have been generated, the key polynomial 9 may be deleted such that no record of the polynomial is stored in memory.

Figure 2:
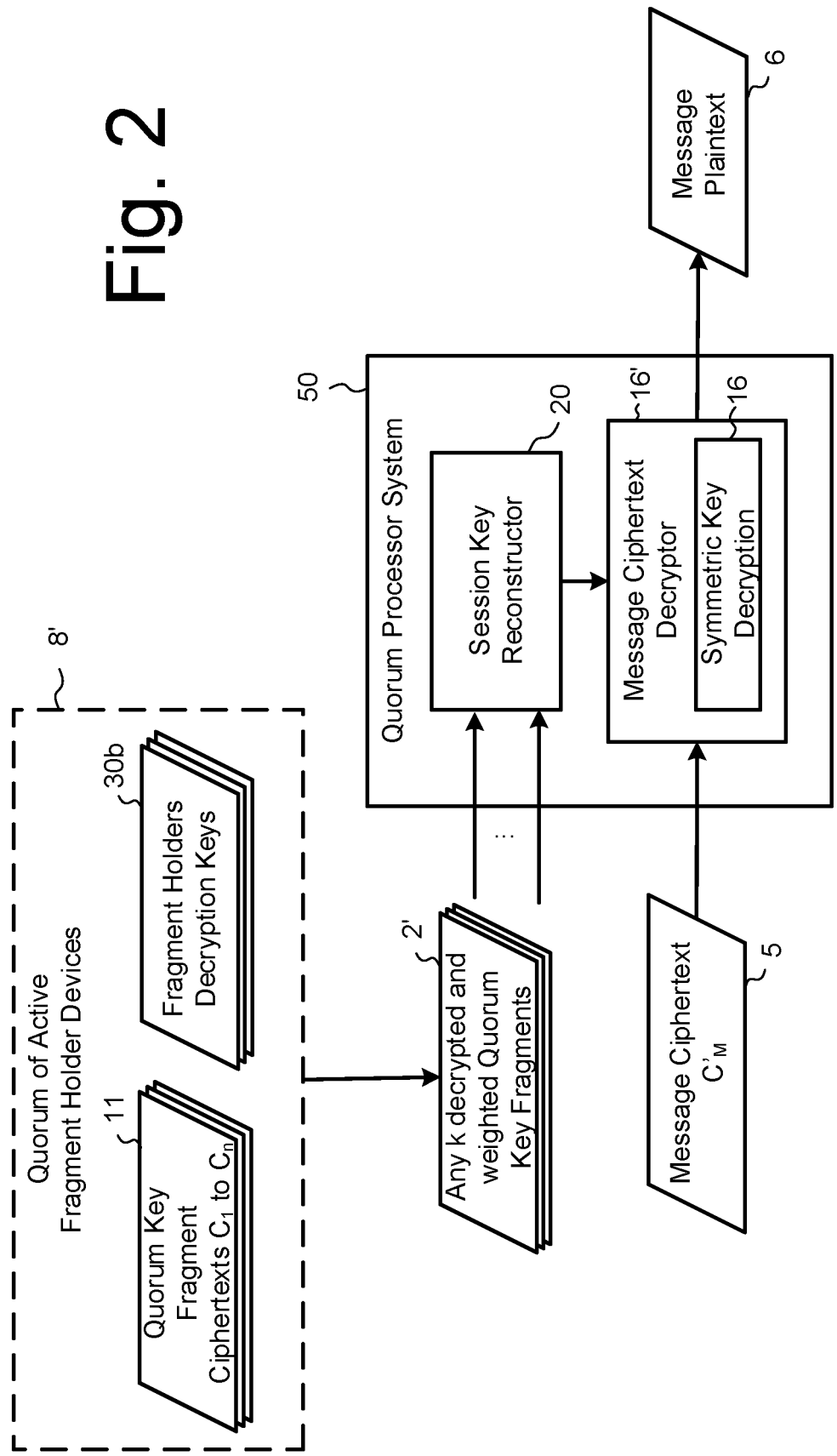
FIG. 2 is a block diagram showing how the message is reconstructed by a quorum of fragment holders using their respective key fragment ciphertexts.

FIG. 2 is a block diagram showing how the original plaintext message 6 is reconstructed by quorum processor system 50 using key fragment ciphertexts 11 received from a quorum of fragment holder devices 8', according to an exemplary embodiment as will be described in greater detail below. In the case of quorum key fragment ciphertexts $C_n$ distributed to fragment holders 8', any fragment holder participating in a quorum is referred herein as an active fragment holder 8'. When a quorum of k active fragment holders is formed, each active fragment holder device 8' decrypts their respective quorum key fragment ciphertext 11 to recover the corresponding session key fragment 2', as originally generated by the session key generator 7. Each decrypted session key fragment 2' is multiplied by a factor, a multiplicative constant, described below, to form a weighted key fragment. The weighting computation may be performed by each respective device 8' or by the quorum processor system 50. The secret value of the session key 2, which may be the encryption key or a value from which the encryption key or decryption key may be derived, is reconstructed by a session key reconstructor 20, for example by summing all k weighted key fragments together. A message ciphertext decryptor 16' decrypts the message ciphertext 5 using the reconstructed session key, to recover the original plaintext message 6.

Preferably for best security practice, although not necessarily, encryption by the ciphertext generator 40 and decryption by the corresponding message ciphertext decryptor 50 are based on an authenticated encryption with associated data (AEAD) cipher, which is a symmetric key, authenticated encryption cipher with auxiliary data. The AEAD cipher performs both encryption and authentication. Any changes to the ciphertext or to the auxiliary data produces an inconsistency in the authentication tag which is detected in decapsulation. In the following exemplary embodiments and worked examples, data encapsulation and decapsulation is described using an AEAD cipher based on the Advanced Encryption Standard in Galois Counter Mode (AES-GCM) cipher suite. Any one of the published variants of the AES-GCM cipher may be used, for example as referenced in "NIST Special Publication 800-38D" and the Internet Engineering Task Force, IETF publication RFC5116. The AES-GCM cipher described in this embodiment is closest to that described in RFC5116. In the present embodiment, a desired quorum size k is decided by the application and this defines the degree of a key polynomial f(x), where $$f(x) = \sum_{i=0}^{k-1} f_i x^i$$

and where the coefficients of f(x) may be chosen randomly with $1 \leq f_i < q$.

In the following worked example, a 128 bit key is used. For a 128 bit key, it may be optimal to choose a prime number that is just less than $2^{128}$, such as q=340282366920938463463374607431768211297.

Figure 3:
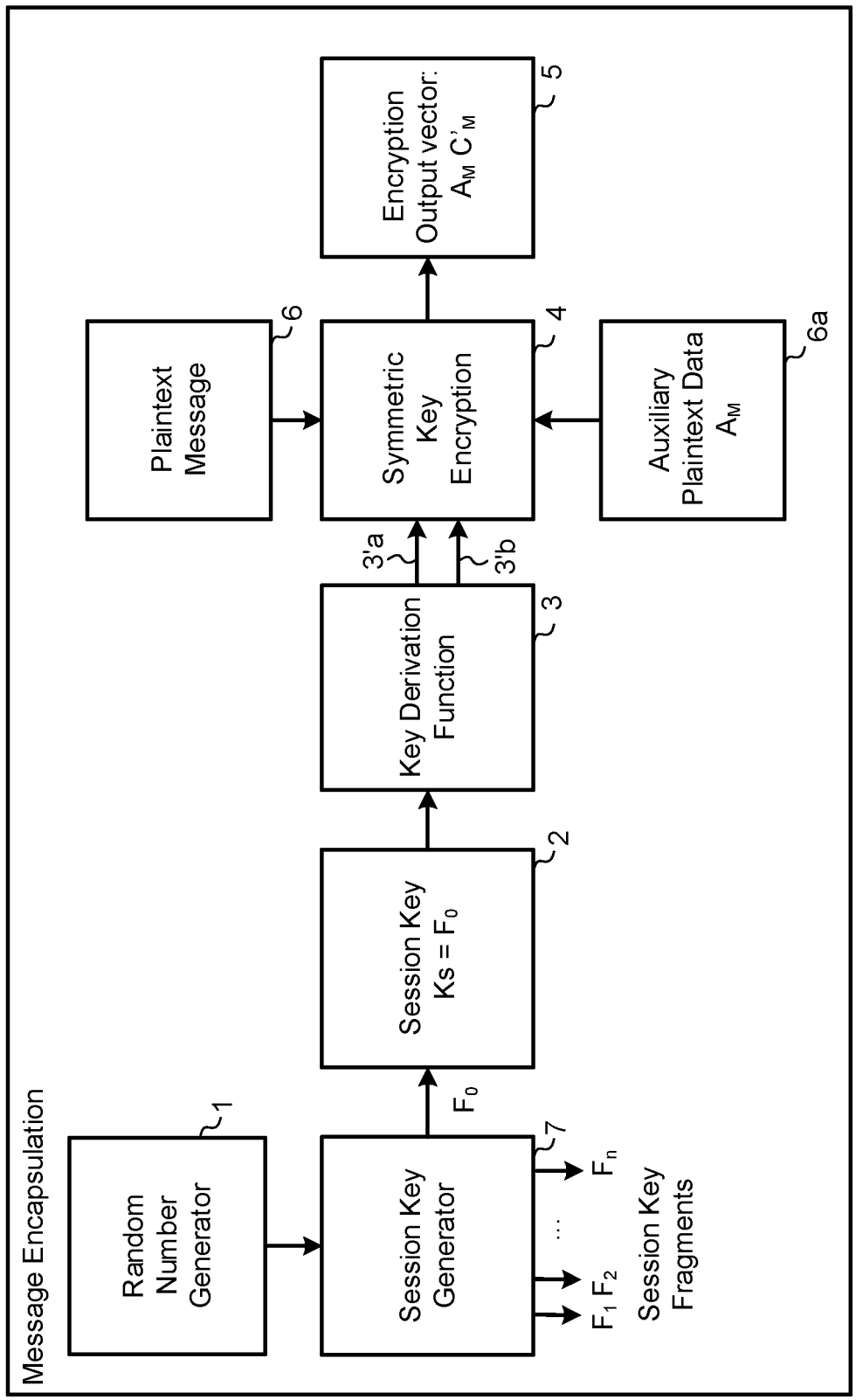
FIG. 3 is a block diagram showing a polynomial with random coefficients defining key fragments and a session key which is input to a key derivation function with the message being encrypted using a symmetric key cipher algorithm.

With reference to the exemplary block flow diagram of FIG. 3, the ephemeral session key 2, referred to as $K_s$, is determined by $K_s = f(x_0)$ where $x_0$ is a pre-decided index, a constant with $1 \leq x_0 < q$. It is optional whether $x_0$ is kept secret or not. In this worked example for a quorum of three out of five, it follows that the degree of f(x) is two and with randomly chosen coefficients, the key polynomial is:

f(x)=
242098346922205483386528352641545681459+
197842866530087320689354884293750008x+
133188720489858074740539155716013399582$x^2$

Choosing arbitrarily $x_0$=67 the session key $K_s$ is given by f(67) and this turns out to be

251471493011974273566231781933717281764

Expressed in hexadecimal which is a commonly used format for keys and ciphertexts the session key value is:

0xbd2fa5d9d5d54c4a9ef48893164a5be4bd2fa5d9d5d5-4c4a9ef48893164a5be4 where the prefix 0x indicates the format is hexadecimal. As shown in FIG. 3, the ephemeral session key 2 is input to a key derivation function 3 which outputs multiple keys in accordance with the AES-GCM standard. In this exemplary case, the key derivation function 3 outputs two keys, the symmetric encryption key 3'a and the initialisation vector IV 3'b. Since the ephemeral session key 2 is different for every ciphertext instance there is no need for a nonce and in this exemplary embodiment, the nonce is nulled out by assigning it zero length in accordance with the AES-GCM standard. The preferred options for the AES-GCM standard, from a security viewpoint, for the nonce and IV are as described in the Internet Engineering Task Force, IETF, publication RFC5116. A commonly preferred key derivation function is the Keccak sponge function defined in the SHAKE standard published by NIST, "SHA-3 Derived Functions: cSHAKE, KMAC, TupleHash, and ParallelHash". To obtain multiple keys, a different domain setting is used in the derivation of each key by appending distinct values to the session key input to the SHAKE key derivation function.

In the present worked example, the AES encryption key is:

0xAB58B13E44D671782BF1DE95C8377E6B obtained from the SHAKE function by appending 0x4B to the ephemeral key $K_s$ detailed above, and the IV 0x0015B27DD3D92CE87A90FABB526DA929 is obtained with 0xAB appended to the ephemeral key.

As shown in FIG. 3, the plaintext message 6 is input, along with auxiliary plaintext data $A_M$ 6a, to the message ciphertext generator 4, which in this embodiment performs symmetric key encryption using AES-GCM encryption. The auxiliary plaintext data 6a is not encrypted but is authenticated along with the message ciphertext $C_M$ by the calculated tag $T_M$ which is also a function of the AES encryption key. As is common notation, the authentication tag is absorbed into the AES-GCM output ciphertext $C'_M$ with $C'_M = C_M \| T_M$.

The auxiliary data 6a could include metadata describing the type of information encrypted, details of the fragment holders, time and date information, etc.

Consider as an example a generic message "The quick brown fox jumps over the lazy dog". Represented as a sequence of ASCII characters the message in hexadecimal is:

0x54 68 65 20 71 75 69 63 6b 20 62 72 6f 77 6e 20 66 6f 78 20 6a 75 6d 70 73 20 6f 76 65 72 20 74 68 65 20 6c 61 7a 79 20 64 6f 67

Using the AES key and IV described above, the computed AES-GCM ciphertext is:

$C_M$=0xe3 6d ce b3 e6 37 af eb e8 14 4e 3c 4b 37 2a da 5a 30 80 7f af 4c da 9a a9 e1 4b 93 76 b4 43 01 d1 88 56 18 62 e8 47 d9 49 0a 00 and the computed authentication tag is $T_M$=0x74 3e 6a 97 83 99 4c ab fa 89 08 ff cc a4 39 8b In this worked example, the length of the ciphertext $C_M$ is the same as the message since AES-GCM is a stream cipher, employing the block cipher AES in counter mode, with authentication comprising an additional 16 bytes.

As also shown in FIG. 3, the session key generator 7 splits the session key 2 into constituent quorum key fragments 2', denoted as $F_x$. This is computed by evaluating the key polynomial 9, f(x), at different values of x. Purely as a simplified example, with arbitrarily chosen values of x=1 to 5, the following five exemplary key fragments 2' can be computed as:

$F_1$=f(1)=350244847777781033957618364142202444752
$F_2$=f(2)=943280636130668728860736316189216072209
$F_3$=f(3)=79726716507133328394089130823881557533
$F_4$=f(4)
 =331502810380915933383182941460868307021
$F_5$=f(5)
 =169091611392537760926605848666345433079

As shown in FIG. 1, each session key fragment 2', $F_n$, is then encrypted by the key fragment ciphertext generator 10 into respective key fragment ciphertexts 11, $C_1$ to $C_n$, based on an encryption key 30a of a corresponding fragment holder 8, and transmitted to the respective fragment holder device 8 to be stored in a memory for subsequent quorum-based data recovery.

Figure 4:
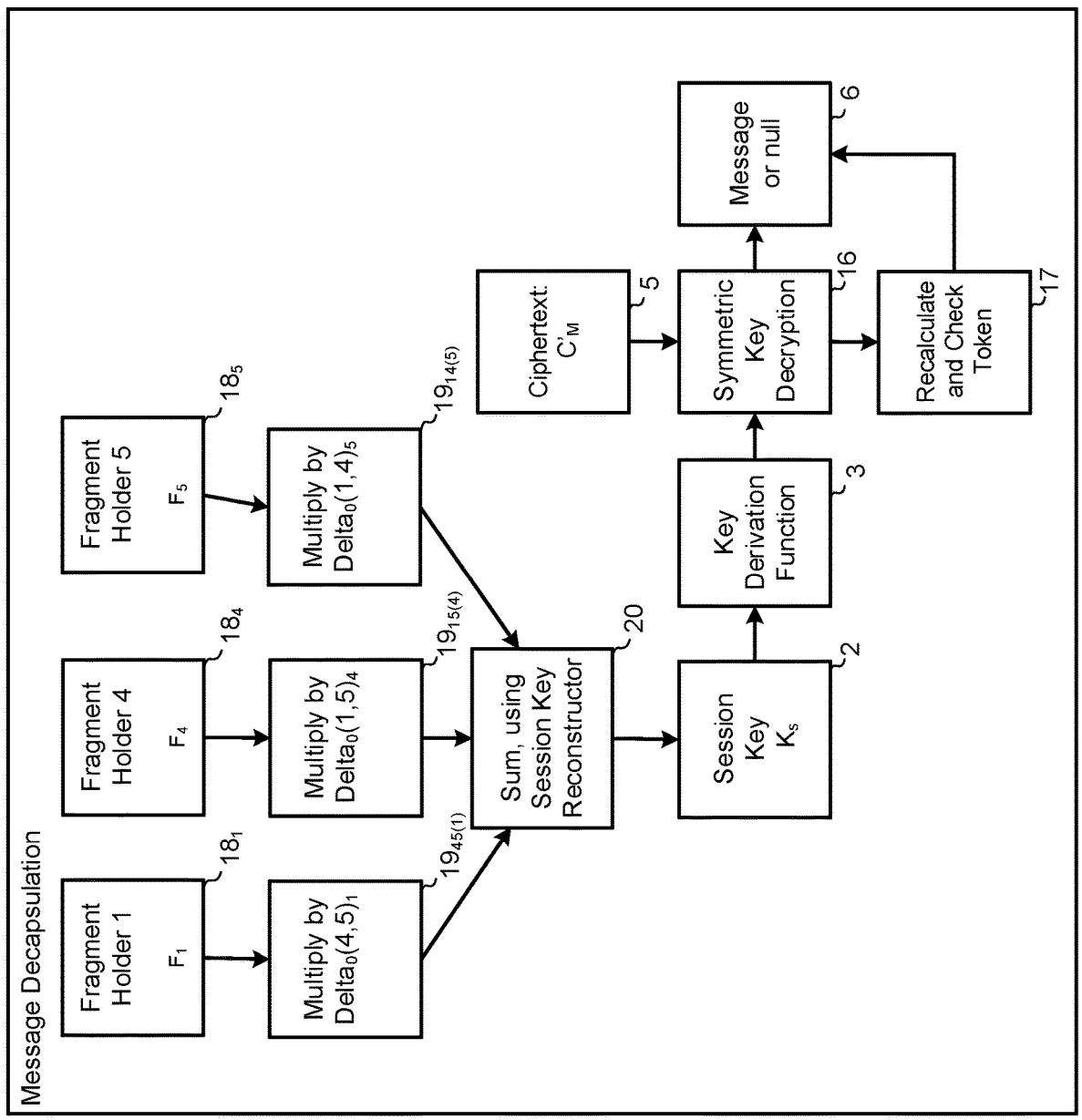
FIG. 4 is a block diagram showing decapsulation of the message by fragment holders 1, 4 and 5 in a worked example of a three-out-of-five quorum system. The key fragments from each fragment holder are weighted by a multiplicative factor which is a function of the fragment holder's index and the other two fragment holders indices. The weighted key fragments are summed together to produce the session key Ks which is input to a key derivation function which produces the IV and decryption key for decryption of ciphertext $C'_M$. The symmetric key cipher token is recalculated and if equal to the token contained in ciphertext $C'_M$ the decrypted message is output, otherwise a NULL symbol is output.

Following from the worked example set out above, the session key 2 may be reconstructed from a minimum of any three out of five key fragments 2' by reconstructing the key polynomial f(x) by the method of Lagrange, and then determining $f(x_0)$ as shown in the block diagram of FIG. 4. Denoting the three key fragments by $f(x_1)$, $f(x_2)$ and $f(x_3)$ then $$f(x) = f(x_1) \frac{(x - x_2)(x - x_3)}{(x_1 - x_2)(x_1 - x_3)} + \quad (1)$$
$$f(x_2) \frac{(x - x_3)(x - x_1)}{(x_2 - x_3)(x_2 - x_1)} + f(x_3) \frac{(x - x_1)(x - x_2)}{(x_3 - x_1)(x_3 - x_2)}$$

It follows that the session key is obtained by $$k_s = f(x_0) = f(x_1) \frac{(x_0 - x_2)(x_0 - x_3)}{(x_1 - x_2)(x_1 - x_3)} + \quad (2)$$
$$f(x_2) \frac{(x_0 - x_3)(x_0 - x_1)}{(x_2 - x_3)(x_2 - x_1)} + f(x_3) \frac{(x_0 - x_1)(x_0 - x_2)}{(x_3 - x_1)(x_3 - x_2)}$$

It may be noticed from this expression above that the session key is given by the sum of three weighted key fragments. Denoting the weighting factors by $\Delta_0(x_a, x_b)_c$ then $$k_s = \Delta_0(x_2, x_3)_1 \cdot f(x_1) + \Delta_0(x_1, x_3)_2 \cdot f(x_2) + \Delta_0(x_1, x_2)_3 \cdot f(x_3)$$

Where $\Delta_0(x_a, x_b)_c$ is given by $$\Delta_0(x_a, x_b)_c = \frac{(x_0 - x_a)(x_0 - x_b)}{(x_c - x_a)(x_c - x_b)} \quad (3)$$

Accordingly, the session key 2 may be reconstructed by receiving from k fragment holders their respective key fragments multiplied by the weighting factors above and then summing these together as depicted in FIG. 4. The recipient of the sum, the session key, may alternatively receive the key fragments directly from the fragment holders and carry out the weighting of the key fragments before the summation. The fragment holders may or may not send the key fragments, already weighted. Considering as an example that fragment holders 1, 4, and 5 form a quorum and contribute their weighted key fragments, which sum to produce the session key. Each fragment holder pre-multiplies their key fragment by the corresponding weighting factor, $\Delta_0(x_a, x_b)_c$. As shown in FIG. 4 the reconstructed session key 2, is input to the key derivation function 3 which outputs the IV and decryption key for decryption of the ciphertext $C'_M$. The token is recalculated and compared to the tag contained in the ciphertext $C'_M$. If both versions of the tag are the same the decrypted message is output as shown in FIG. 4. If both tag versions differ then the ciphertext $C'_M$ is not authentic and a null symbol is output.

Continuing with the worked example, the weighted key fragments are:
fragment holder 1: weighted key fragment 17115168677580336102911570758033869397
fragment holder 4: weighted key fragment 65432278357884808163321124195582037069
fragment holder 5: weighted key fragment 14887527878286104373794950157796550720

It can be easily verified that the sum of these three weighted key fragments is equal to the session key: 25147149301197427356623178193371728176

Figure 5:
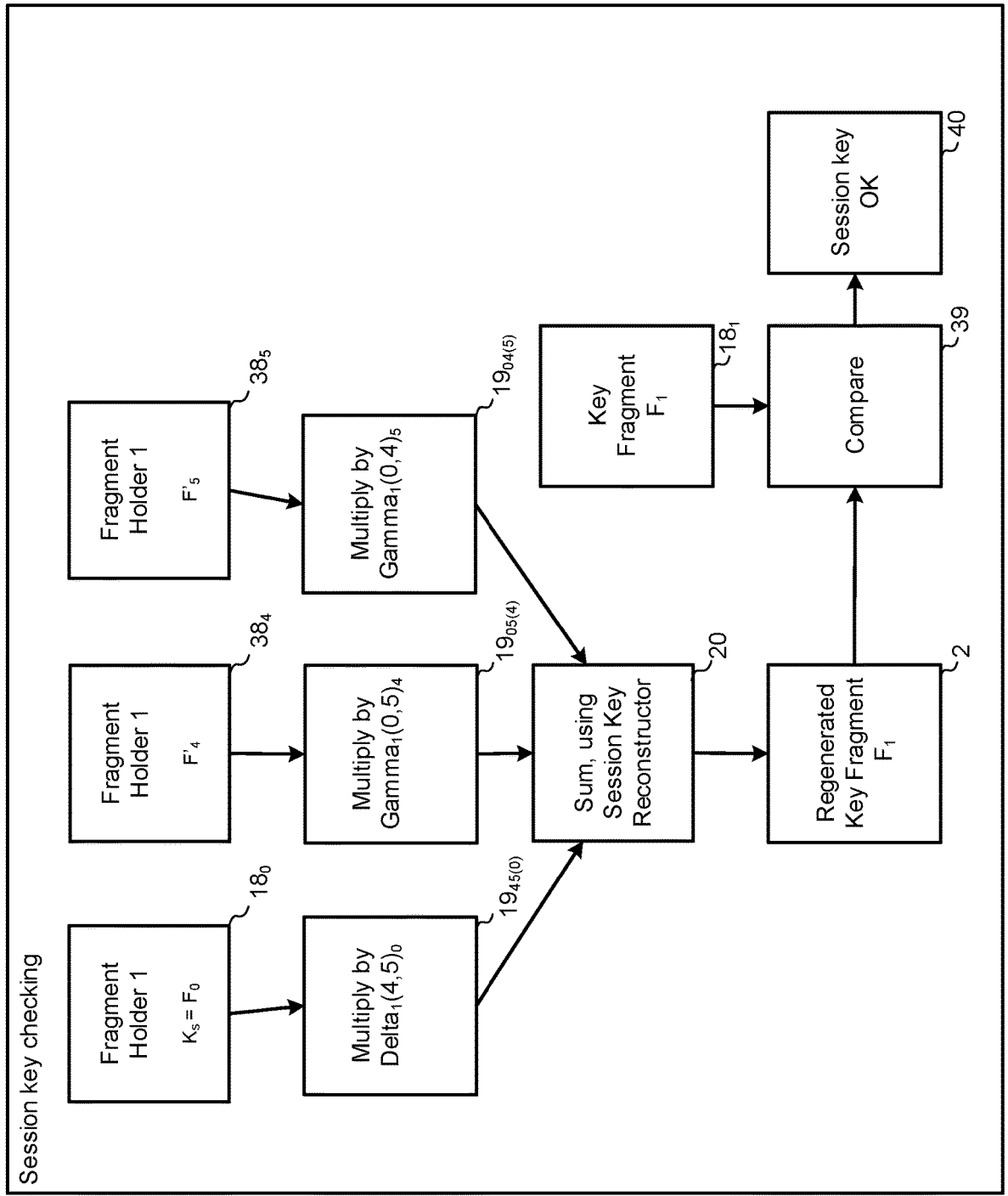
FIG. 5 is a block diagram showing how the session key derived by the quorum may be checked for correctness by using it to re-derive the key fragment for fragment holder 1. Equality with the existing key fragment indicates the session key is correct.

In the case that the recipient is one of the fragment holders or holds one of the key fragments, then it is easy for the fragment holder to check that the session key is correct by using the newly calculated session key which is equal to $f(x_0)$ and the two received weighted key fragments to calculate their own key fragment. The arrangement is shown in FIG. 5. Consider that the recipient is fragment holder $x_1$, then $$f(x_1) = \Delta_1(x_2, x_3)_0 \cdot f(x_0) + \Delta_1(x_0, x_3)_2 \cdot f(x_2) + \Delta_1(x_0, x_2)_3 \cdot f(x_3) \quad (4)$$

Since fragment holder $x_1$ has already the weighted key fragment $\Delta_0(x_1, x_3)_2 \cdot f(x_2)$ then defining $$\gamma_1(x_1, x_3)_2 = \frac{\Delta_1(x_0, x_3)_2}{\Delta_0(x_1, x_3)_2}$$

Then the fragment holder $x_1$ can simply multiply the previous weighted key fragment by $\gamma_1(x_1, x_3)_2$ to obtain $\Delta_1(x_0, x_3)_2 \cdot f(x_2)$ as shown in FIG. 5.
Consequently fragment holder $x_1$ can check this calculated key fragment is equal to the key fragment value already in their possession. Following the worked example with key fragments $(x_0)$, $f(x_4)$, $f(x_5)$ the weighted key fragments are:
Weighted f(67): 28721609840045810526123156441855-0559684
Weighted f(4): 25488007757404331882304172992060-1725098
Weighted f(5): 17349304264515360623823775693860-4382564

It is straightforward to sum these weighted key fragments to produce:
71558921861965550303225110512777566673346
which after reduction modulo q produces:
35024484777778103395761836414220244752
which is equal to f(1), denoted as $F_1$ in FIG. 5, and is the key fragment originally distributed to fragment holder $x_1$.

As also shown in FIG. 5, the comparison of the original key fragment $F_1$, 18$_1$ with the regenerated key fragment $F_1$ verifies that the other fragment holders have supplied valid weighted key fragments and the session key is correct.

It is advantageous to store the key fragments as ciphertexts that only the fragment holder can decrypt or alternatively by one or more administrators as an interim step prior to distribution of key fragments to fragment holders. This may be achieved by encrypting each key fragment by using the public key or symmetric key of the fragment holder or administrator. Only the holder of the private key, the intended fragment holder or administrator, is able to decrypt the ciphertext and access the key fragment.

A further advantage of this approach is that the selection of fragment holders does not have to be done at the time of encryption of the message and generation of the key fragments. Potential fragment holders may be selected and their public keys used to encrypt the shares. At a later date the respective ciphertexts may be passed on to the nominated fragment holder or deleted if not used.

Figure 6:
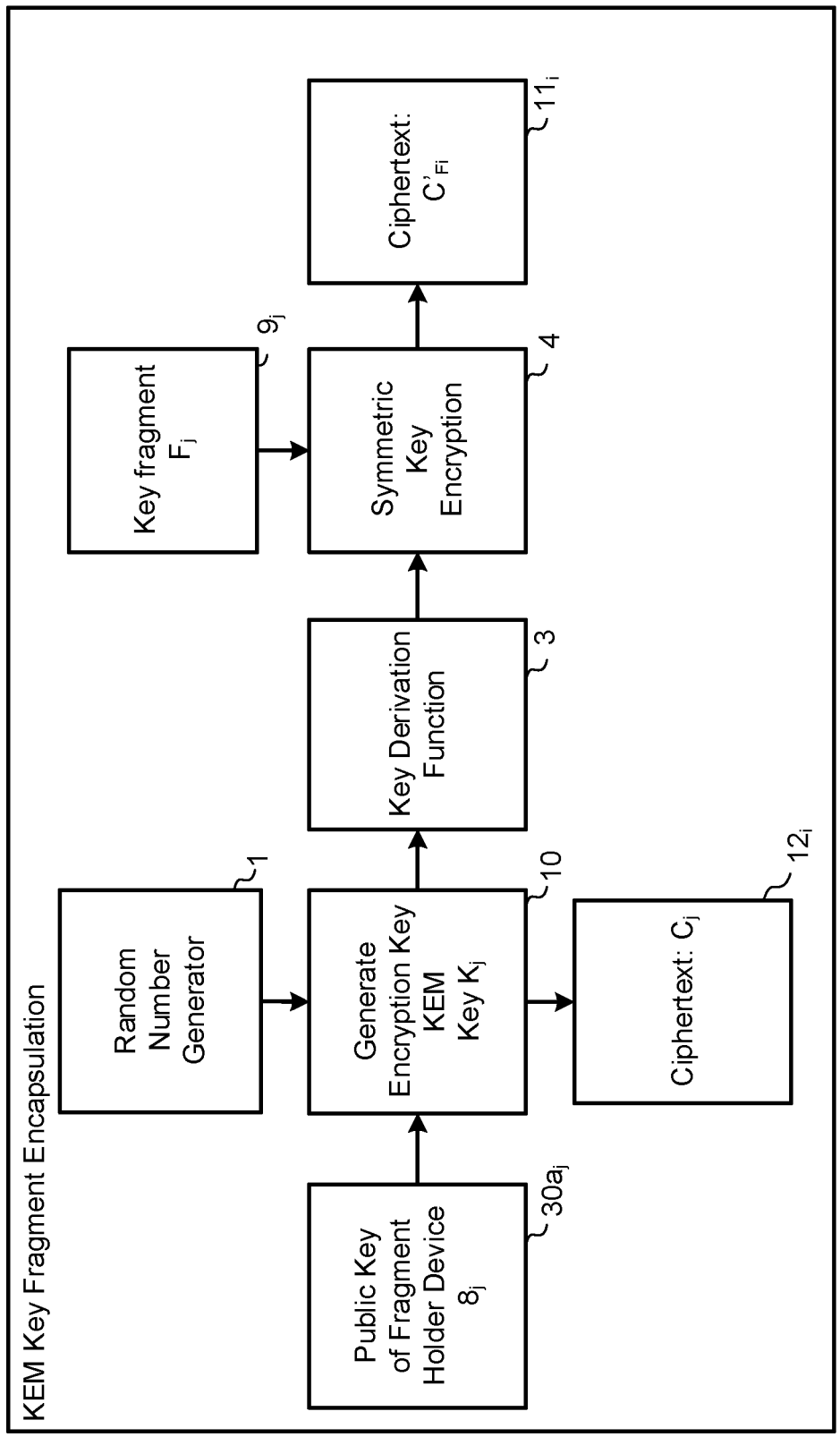
FIG. 6 is a block diagram showing a key fragment for fragment holder j being encrypted using the symmetric key cipher algorithm, with the encryption key being derived from a random key which is encapsulated by a Key Encapsulation Mechanism (KEM) using Fragment Holder j's public encryption key.

FIG. 6 is a block flow diagram of an exemplary alternative embodiment implementing session key fragment encapsulation using a Key Encapsulation Mechanism (KEM). In public key encryption, it is generally known to encrypt a randomly chosen session key and for this session key to be used as the encryption key for an AEAD symmetric key cipher such as AES-GCM described above. Such a hybrid Key Encapsulation Mechanism—Data Encapsulation Mechanism (KEM-DEM) approach has the advantage that there are no interaction risks between the two ciphers due to a particular choice of message. An adversary is unable to mount a chosen plaintext (the message) attack on the public key cipher. There is no need for any message padding, thus eliminating padding attacks that have been the downfall of past implementations of traditional ciphers such as RSA. Also the DEM cipher is independent of the public key cipher and can be more rigorously tested and cryptanalysed as has been the case for AES-GCM.

As shown in FIG. 6, the public key 30$a_j$ of a fragment holder device 8$_j$ is used to encrypt a random, uniformly chosen secret value, for example using the random number generator 1 and consistent with the public key encryption system being used. It is appreciated that there is no need for this random value to be confined to the range 1 to q, that was used for the polynomial key, or any other particular range of values since the key derivation function 3 produces the correct length keys for encryption 4.

As a worked example of a public key KEM system that may be used by each fragment holder, as depicted in FIG. 6, a public key Elliptic Curve KEM is described below. The elliptic curve is defined by an equation $$y^2 = x^3 + ax + b \text{ modulo } p$$

which defines the relationship between the x coordinate values and the y coordinate values of points that lie on the elliptic curve. Arithmetic is carried out in a prime field defined by a prime p in evaluating points on the curve. The security level in bits of ECC is given by $\sqrt{p}$ which means that a 256 bit prime needs to be used for the security level to be consistent with the 128 bit worked example thus far. A suitable prime is $2^{256}$–189=115792089237316195423570985008687907853269984665640564039457584007913-129639747 However these large numbers will make it difficult to see the procedures involved in the ECC KEM and so for brevity the following Elliptic Curve KEM, worked example uses a 64 bit prime:

p=18446744073709480063

Elliptic curve based cryptography is inherently more secure if the cofactor of the elliptic curve is 1 since there is no need to worry that public key points are in a small subspace of points. A cofactor of 1 means that the curve order is prime. The curve order is a function of p and the equation defining the curve. For p=18446744073709480063 a curve with prime order is given by the equation:

$$y^2 = x^3 - 3x + 1317 \text{ modulo } p$$

For this curve the curve order q is 18446744076907029473

As the curve order is prime any point on the curve can serve as the basepoint P. This basepoint may be chosen somewhat arbitrarily as the smallest value of x that is a point on the curve. Due to the equation being in $y^2$ there are two such points and the smaller of the two y coordinate values is used for the basepoint.

Accordingly the basepoint turns out to be x=4 with y=18446744073709480026 and so:

P=(4, 18446744073709480026)

For the public key KEM a secret value u, the private key, is chosen uniformly in the range 1<u<q and the public key is the point on the curve u.P=U.

For example with u=3317997563

The public key point $$U = 3317997563.(4, 18446744073709480026)$$
$$= (6419190284267089830, 17256174497137582459)$$

This is a long term public key for the fragment holder. For a KEM to be established between the public key holder and a third party the third party picks a private key v randomly and sends the public point V=v.P to the fragment holder. For example with v=19267639 the public key point V is

V=(16693877071838898283,5163510888004117537)

which is the ciphertext for the KEM key.

The KEM key itself is the secret point v.U=u.V which both parties can compute, $$v.U = 19267639.(6419190284267089830, 17256174497137582459)$$
$$= (10821484516746730908, 7842878251714791807)$$

Similarly the fragment holder can calculate u.V=3317997563. (16693877071838898283, 5163510888004117537)

Producing the same KEM secret point with u. V=(10821484516746730908, 7842878251714791807)

Applying the SHAKE function to the concatenation of the x and y coordinates of the secret point produces the KEM key.

With this worked example applied to one of the fragment holders, say Fragment Holder j, $8_j$ shown in FIG. 6 then the KEM key $K_j$ 10 is 10821484516746730908. Expressed in the conventional hexadecimal format for encryption keys, the KEM key is:

0x962da2d553141d9c

The Ciphertext $C_j$ 12 shown in FIG. 6, is the value of V, namely (16693877071838898283, 5163510888004117537)

As shown in FIG. 6, the KEM key $K_j$ 10 is input to the Key Derivation Function 3 which produces the IV and encryption key used to encrypt Key fragment $F_j$ $9_j$ producing the ciphertext $C_{Fj}$ $11_j$ in similar manner as described above for the encryption of the message, except that there is no auxiliary plaintext data and consequently the auxiliary plaintext data is replaced with a null character.

Figure 7:
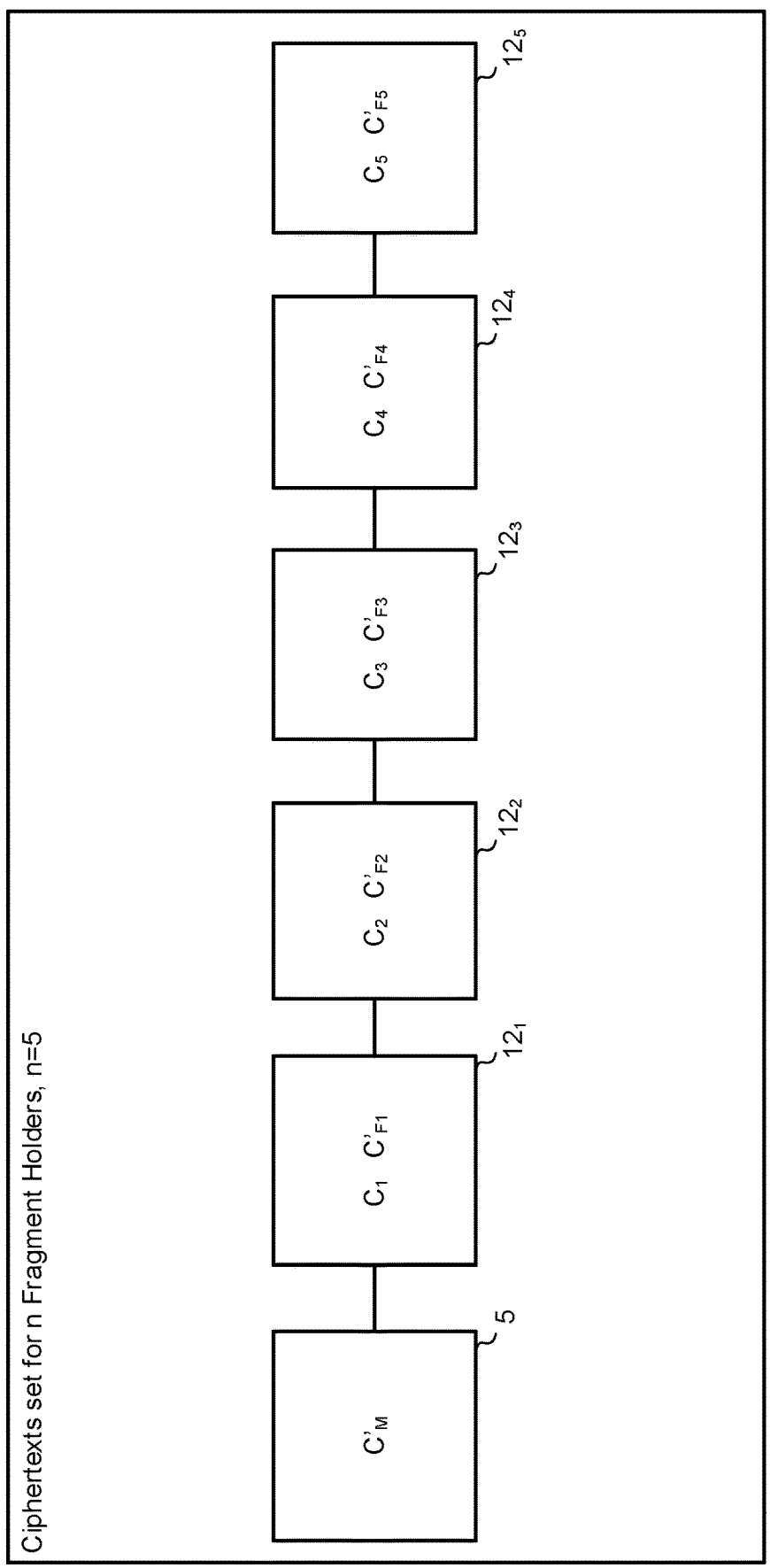
FIG. 7 illustrates a worked example showing all of the information necessary to reconstruct the message, for any combination of three fragment holders from five fragment holders, all of the information encrypted as eleven ciphertexts, from which the message is reconstructed using a quorum obtained by selecting subsets of seven ciphertexts, with two ciphertexts per fragment holder.
Figure 8:
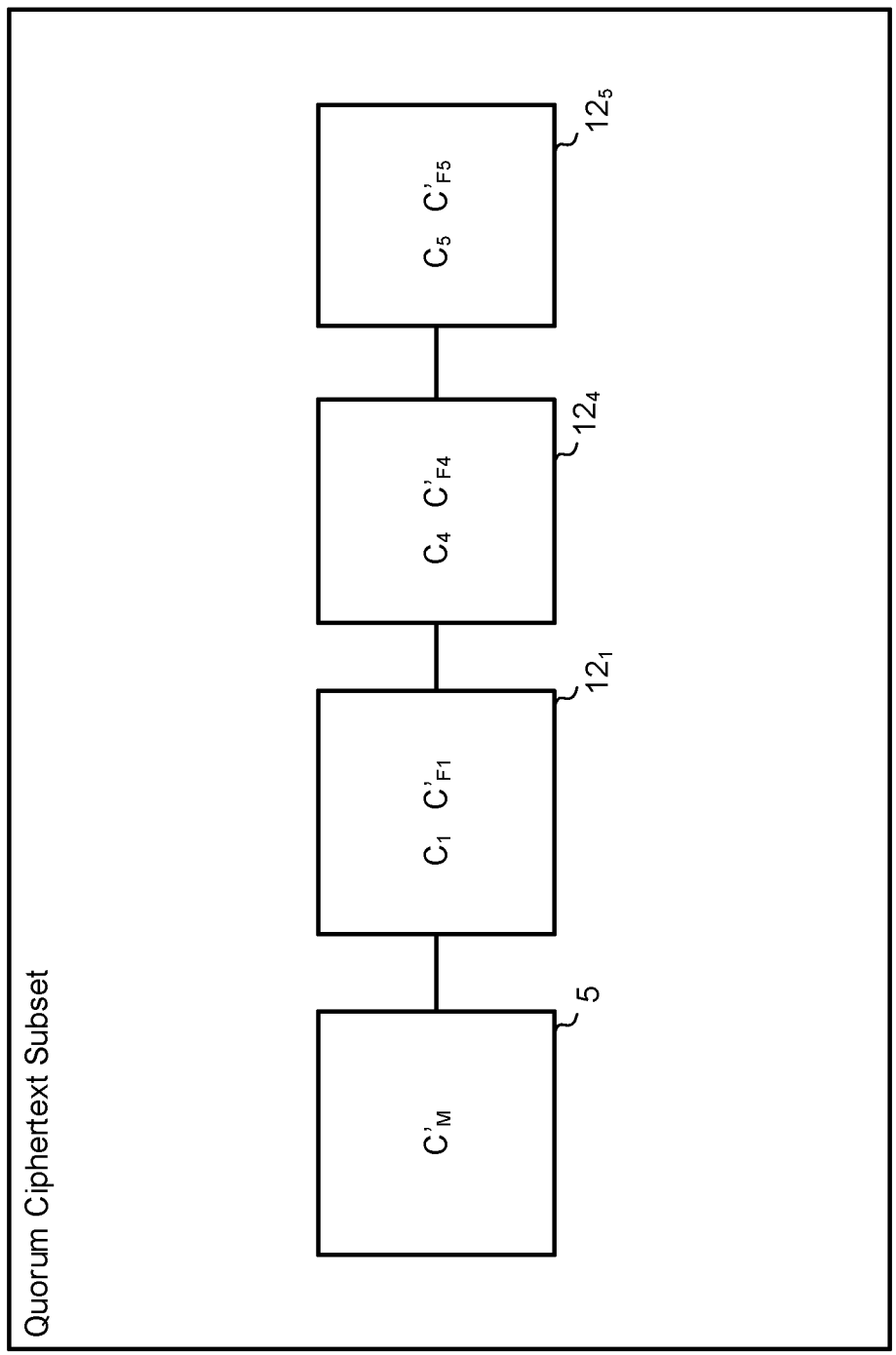
FIG. 8 illustrates the worked example of the seven ciphertexts needed by a quorum of three fragment holders to reconstruct the message, for a three-out-of-five quorum system.

Following from the above worked example of a three out of five quorum system, there are five fragment holder devices 8, with each fragment holder device 8 storing two ciphertexts, $C_i$ and $C'_{Fi}$. As shown in FIG. 7, there are a total of eleven ciphertexts, including the message ciphertext $C'_M$, as shown in FIG. 7 from which any of the ten possible combinations of three fragment holders out of five, may be used to retrieve the original plaintext message. For example with fragment holders 1, 4 and 5, the subset of ciphertexts from which the message may be retrieved is illustrated in FIG. 8.

Figure 9:
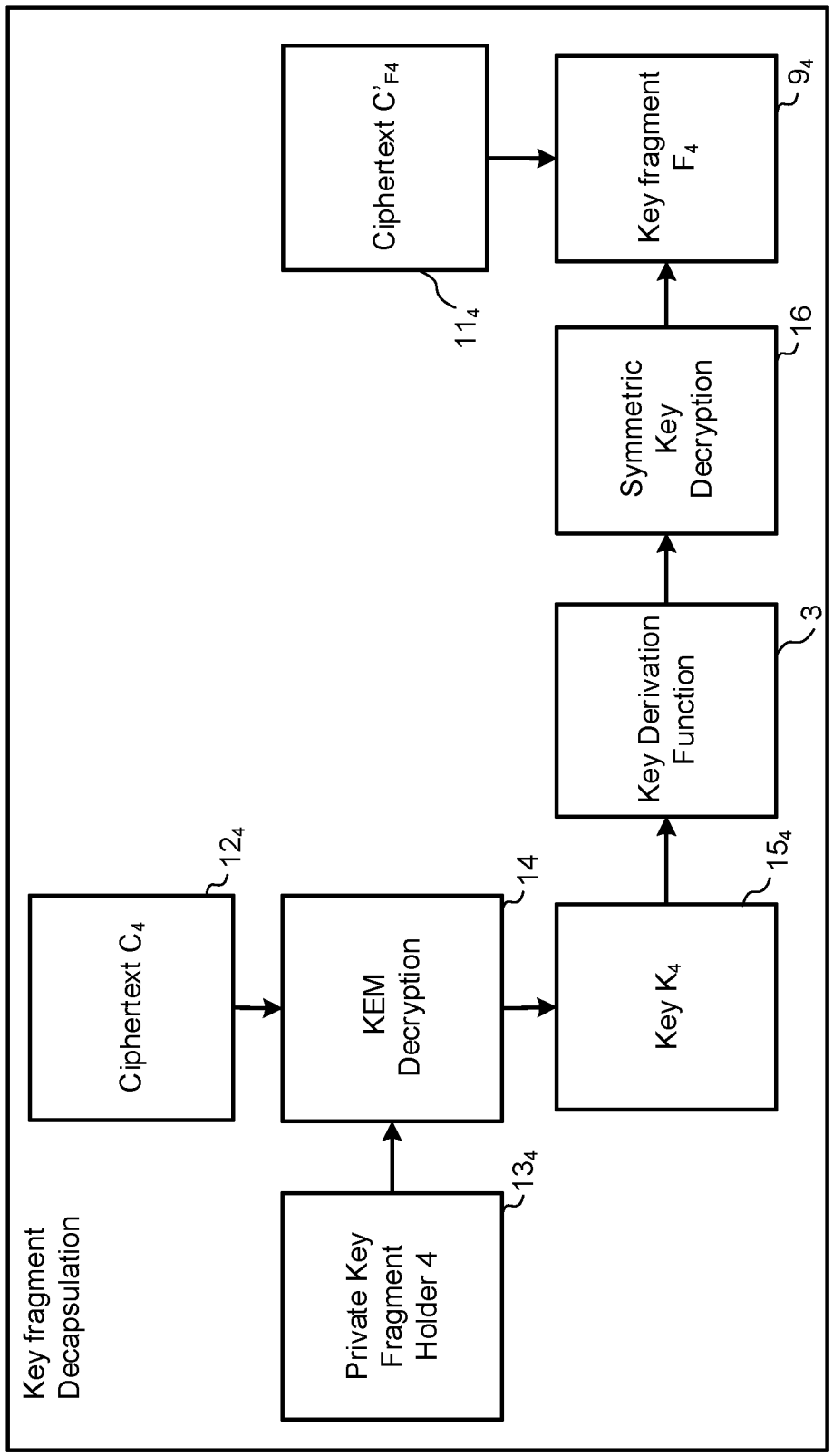
FIG. 9 shows the decapsulation of a key fragment by one of the fragment holders, fragment holder 4 by using their private key to decrypt a Key Encapsulation Mechanism ciphertext to produce a key $K_4$ which is input to a key derivation function. This function produces an initialisation vector (IV) and decryption key which is used to decrypt a ciphertext, using the symmetric key cipher algorithm, to produce the key fragment $F_4$.

FIG. 9 shows the steps taken by one of the fragment holders, holder 4, in decapsulating their key fragment from their two ciphertexts. Using their private key, fragment holder 4 decrypts ciphertext $C_4$ to produce the KEM key $15_4$ as shown in FIG. 9. This key is input to the key derivation function 3 which outputs the IV and decryption key for decryption 16 of ciphetext $C'_{F4}$, $11_4$ which produces the key fragment $F_4$ $9_4$.

Figure 10:
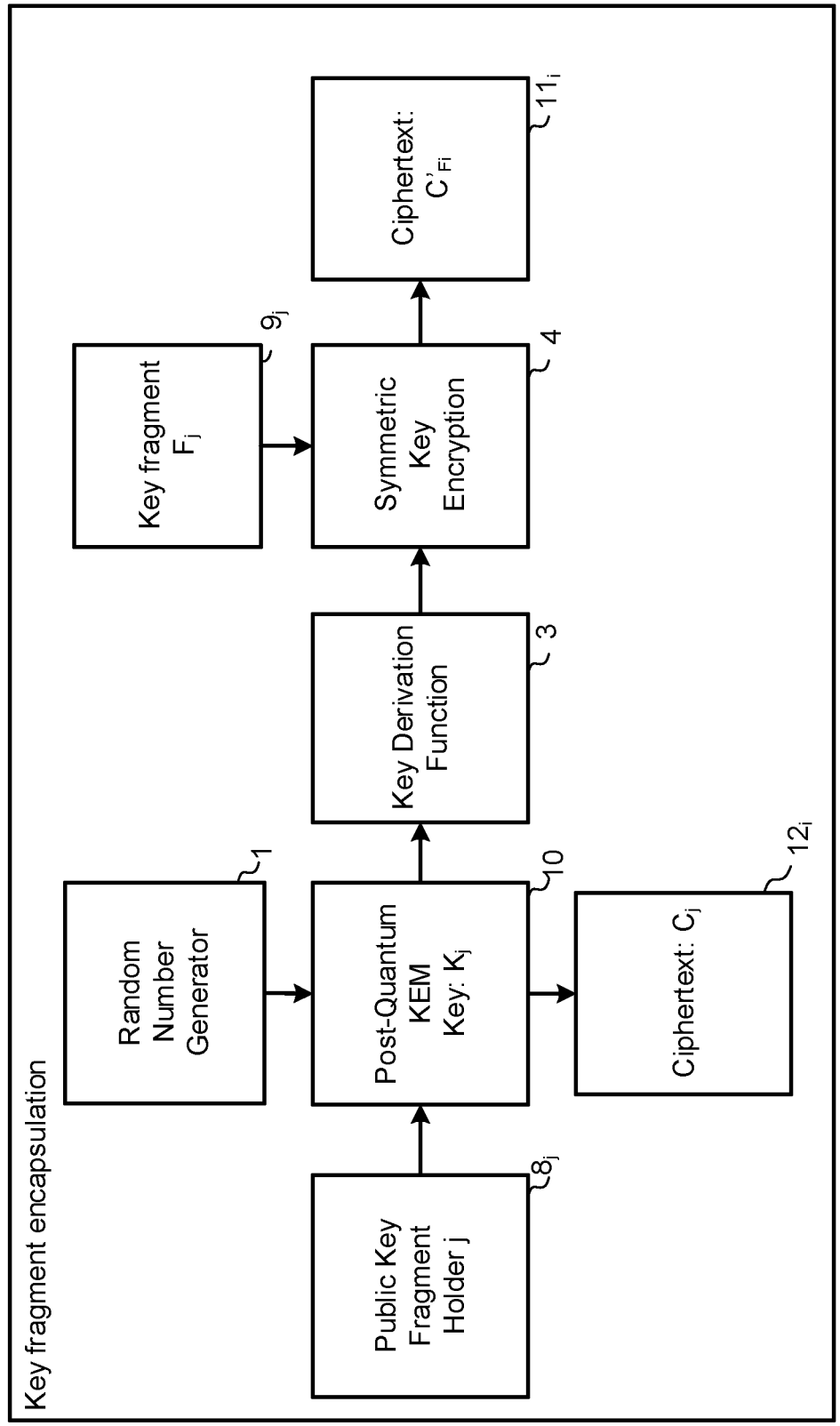
FIG. 10 is a block diagram showing the encapsulation of a key fragment j with key wrapping using a quantum computer resistant (post-quantum) Key Encapsulation Mechanism KEM whose key is input to a key derivation function to encrypt key fragment Fj to produce ciphertext $C'_{Fj}$. The KEM cipher produces ciphertext $C_j$.

In a further embodiment a different public key KEM, a Post-Quantum public key KEM is used to encapsulate the random key Kj in a ciphertext Cj as shown in FIG. 10. A Post-Quantum public key KEM is resistant to attack from a future implementation of a quantum computer. One example of a Post-Quantum public key KEM is based on a lattice construction and is described in this embodiment. Ciphertexts are represented as polynomials with integer coefficients in the range 0 to q–1 where q is an integer constant. All polynomials are calculated modulo $1+x+x^p$ where p is an integer constant.

In a worked example p is 37 and q is 137. The private key f(x), is a polynomial with to coefficients randomly chosen to be 3 or q–3. In this example $t_2$=19. The first coefficient is equal to 1. In this example $$f(x)=1+3x^3+3x^4+134x^6+134x^8+3x^9+3x^{10}+134x^{11}+3x^{13}+3x^{14}+134x^{15}+3x^{18}+134x^{19}+134x^{24}+134x^{25}+134x^{27}+134x^{32}+134x^{34}+3x^{35}+3x36$$

To generate the public key polynomial a polynomial g(x) with $t_1$ randomly chosen non-zero coefficients equal to 3 or q–3 is first generated. In this example $t_1$=20 and $$g(x)=3x^3+134x^4+134x^6+134x^9+3x^{12}+134x^{14}+134x^{15}+3x^{16}+3x^{19}+3x^{20}+134x^{21}+134x^{24}+134x^{26}+134x^{27}+134x^{28}+134x^{29}+134x^{30}+134x^{31}+134x^{33}+33x^{35}$$

The public key polynomial pk(x) is given by pk(x)=g(x)/f(x) modulo $1+x+x^p$

In this worked example it is found that pk(x) is given by $pk(x)=134+34x+76x^2+24x^3+32x^4+51x^5+18x^6+96x^7+$
$74x^8+41x^9+2x^{10}+45x^{11}+107x^{12}+68x^{13}+68x^{14}+$
$4x^{15}+118x^{16}+41x^{17}+23x^{18}+112x^{19}+52x^{20}+$
$94x^{21}+123x^{22}+115x^{23}+101x^{24}+23x^{25}+81x^{26}+$
$23x^{27}+133x^{28}+129x^{29}+124x^{30}+53x^{31}+53x^{32}+$
$20x^{33}+48x^{34}+14x^{35}+14x^{36}$ To generate a ciphertext polynomial c(x) a blinding polynomial s(x) with $t_2$ randomly chosen non-zero coefficients equal to 1 or q−1 is first generated. In this example $t_2$=25 and $s(x)=136+136x^3+x^5+136x^7+136x^8+136x^9+136x^{10}+$
$x^{11}+x^{12}+136x^{14}+x^{15}+x^{16}+136x^{18}+136x^{19}+$
$136x^{20}+136x^{21}+x^{22}+x^{23}+136x^{25}+136x^{26}+$
$136x^{29}+x^{30}+x^{32}+136x^{34}+x^{35}$ The ciphertext polynomial is calculated using c(x)=s(x).pk(x)+m(x) modulo $1+x+x^p$ where m(x) is a polynomial defining the KEM key with $t_3$ non-zero coefficients equal to 1 randomly chosen, in this example with $t_3$=24:

$m(x)=1+x+x^3+x^4+x^6+x^7+x^9+x^{10}+x^{11}+x^{13}+x^{14}+x^{15}+$
$x^{17}+x^{18}+x^{20}+x^{21}+x^{22}+x^{23}+x^{26}+x^{27}+x^{28}+x^{32}+x^{34}+$
$x^{35}$

Evaluating the ciphertext polynomial c(x)=s(x).pk(x)+m(x) modulo $1+x+x^p$ produces $c(x)=105+49x+61x^2+17x^3+68x^4+44x^5+24x^6+31x^7+$
$109x^8+66x^9+15x^{10}+68x^{11}+85x^{12}+68x^{13}+67x^{14}+$
$109x^{15}+51x^{16}+129x^{17}+107x^{18}+87x^{19}+30x^{20}+$
$64x^{21}+132x^{22}+x^{23}65x^{24}+89x^{25}+13x^{26}+117x^{27}+$
$21x^{28}+32x^{29}+93x^{30}+70x^{31}+20x^{32}+76x^{33}+$
$112x^{34}+19x^{35}+26x^{36}$ The ciphertext may be alternatively represented by a vector of the coefficients:
{105 49 61 17 68 44 24 31 109 66 15 68 85 68 67 109 51 129 107 87 30 64 132 1 65 89 13 117 21 32 93 70 20 76 112 19 26} as a 37 byte sequence.

To decapsulate the ciphertext and obtain the KEM key the holder of the private key multiplies the ciphertext represented as a polynomial c(x) by the private key polynomial to obtain a polynomial u(x).

$u(x)=c(x).f(x)$ modulo $1+x+x^{37}$

In this example u(x) turns out to be $u(x)=123+114x+125x^2+4x^3+4x^4+122x^5+123x^6+$
$129x^7+116x^8+120x^9+4x^{10}+7x^{11}+6x^{12}+22x^{13}+$
$28x^{14}+7x^{15}+3x^{16}+132x^{17}+10x^{18}+128x^{19}+$
$132x^{20}+13x^{21}+129x^{22}+126x^{23}+128x^{25}+120x^{26}+$
$13x^{27}+129x^{28}+122x^{29}+21x^{31}+132x^{32}+6x^{33}+$
$10x^{34}+28x^{35}+6x^{36}$ To produce m(x) the coefficients of u(x) need to be evaluated modulo 3, but firstly negative coefficients, those greater that (q−1)/2 are negated and added to q to produce u'(x)

$u'(x)=14+23x12x^2+4x^3+4x^4+15x^5+16x^6+8x^7+21x^8+$
$17x^9+4x^{10}+7x^{11}+6x^{12}+22x^{13}+28x^{14}+7x^{15}+3x^{16}+$
$5x^{17}+10x^{18}+9x^{19}+5x^{20}+13x^{21}+8x^{22}+11x^{23}+9x^{25}+$
$17x^{26}+13x^{27}+8x^{28}+15x^{29}+21x^{31}+5x^{32}+6x^{33}+$
$10x^{34}+28x^{35}+6x^{36}$

The coefficients of u'(x) are reduced modulo 3 to produce v(x)

$v(x)=2+2x+x^3+x^4+x^6+2x^7+x^9+x^{10}+x^{11}+x^{13}+x^{14}+x^{15}+$
$2x^{17}+x^{18}+2x^{20}+x^{21}+2x^{22}+2x^{23}+2^{26}+x^{27}+2x^{28}+$
$2x^{32}+x^{34}+x^{35}$

Lastly the non-zero coefficients are equated to 1 to reproduce the KEM key polynomial m'(x)

$x(x)=1+x+x_3+x^4+x^6+x^7+x^9+x^{10}+x^{11}+x^{13}+x^{14}+x^{15}+x^{17}+$
$x^{18}+2x^{20}+x^{21}+x^{22}+x^{23}+x^{26}+x^{27}+x^{28}+x^{32}+x^{34}+x^{35}$

The reason why the original KEM key is reproduced is because algebraically c(x).f(x) modulo $1+x+x^{37}$=s(x).g(x)f(x)/f(x)+m(x)f(x) modulo $1+x+x^{37}$=s(x)g(x) modulo $1+x+x^{37}$+m(x)f(x) modulo $1+x+x^{37}$ The first term is a polynomial with all coefficients a multiple of 3 and so modulo 3 produces zero, leaving only the second term.

For the second term, the coefficients of m(x).f(x) modulo $1+x+x^{37}$ are multiples of 3 apart from f(0).m(x) so that after reducing the coefficients modulo 3 the only part left is f(0).m(x)=m(x). As a result of the modulo q arithmetic a negative value −|y| can result as q−|y|. Realigning q with the zero axis means that y=1=−2 modulo 3 results in y=2. Hence the last step above where coefficients equal to 2 are made equal to 1.

Expressing the coefficients of m'(x) in hexadecimal and appending the hash function, domain splitting value of 0x 0203 produces the input to the key derivation function shown in FIG. 10:

0x 01 01 00 01 01 00 01 01 00 01 01 01 00 01 01 01 00 01 01 00 01 01 01 01 00 00 01 01 01 00 00 00 01 00 01 01 00 02 03

The Ciphertext $C_j$ 12 shown in FIG. 10, which encapsulates this KEM key in this example is the sequence of 37 numbers:
{105 49 61 17 68 44 24 31 109 66 15 68 85 68 67 109 51 129 107 87 30 64 132 1 65 89 13 117 21 32 93 70 20 76 112 19 26}

As shown in FIG. 10 the KEM key $K_j$ 10 is input to the Key Derivation Function 3 which produces the IV and encryption key used to encrypt Share $F_j$ 9$_j$ producing the ciphertext $C_{F,j}$, 11$_j$ The Key Derivation Function 3 in this example produces thesymmetric key encryption key, in hexadecimal:
0x43 F5 86 13 AE 5E 06 1C D9 43 43 E1 68 8C 06 5A With the appended KEM key input, in hexadecimal:
0x01 01 00 01 01 00 01 01 00 01 01 01 00 01 01 01 00 01 01 00 01 01 01 01 00 00 01 01 01 00 00 00 01 00 01 01 00 02 04 the Key Derivation Function 3 produces the IV, in hexadecimal:
0x58 F2 20 94 42 91 92 39 24 CF 6A B6 B8 A2 11 09

The IV and encryption key is used to symmetric key encrypt 4 key fragment $F_j$ 9$_j$ producing the ciphertext $C_{F,j}$, 11$_j$ The AEAD encryption is the same as described above in respect of message encryption, noting that there is no auxiliary plaintext data and consequently the auxiliary plaintext data is replaced with a null character.

In this worked example, the values for prime p, and the parameters $t_1$ and q are for illustration purposes and do not provide much security. However increasing these values is sufficient to produce commonly required levels of security. For example with p=827, and with parameters $t_1$=250 and q=8087 over 256 bits of security is obtained. With these parameters, both the public key size and the ciphertext size are approximately 1350 bytes each.

In this exemplary embodiment, the KEM cipher is based on the computational difficulty of determining an error vector in a lattice which has hidden structure. This type of cipher, unlike the public key KEM cipher described in the first embodiment is resistant to being broken by a quantum computer. As such this embodiment is a post-quantum public key quorum cryptosystem.

In an alternative embodiment, a symmetric key KEM cipher is used to encrypt the respective key fragment value for each fragment holder. Since sharing of symmetric keys is not secure, long term, only ephemeral keys are shared.

Figure 11:
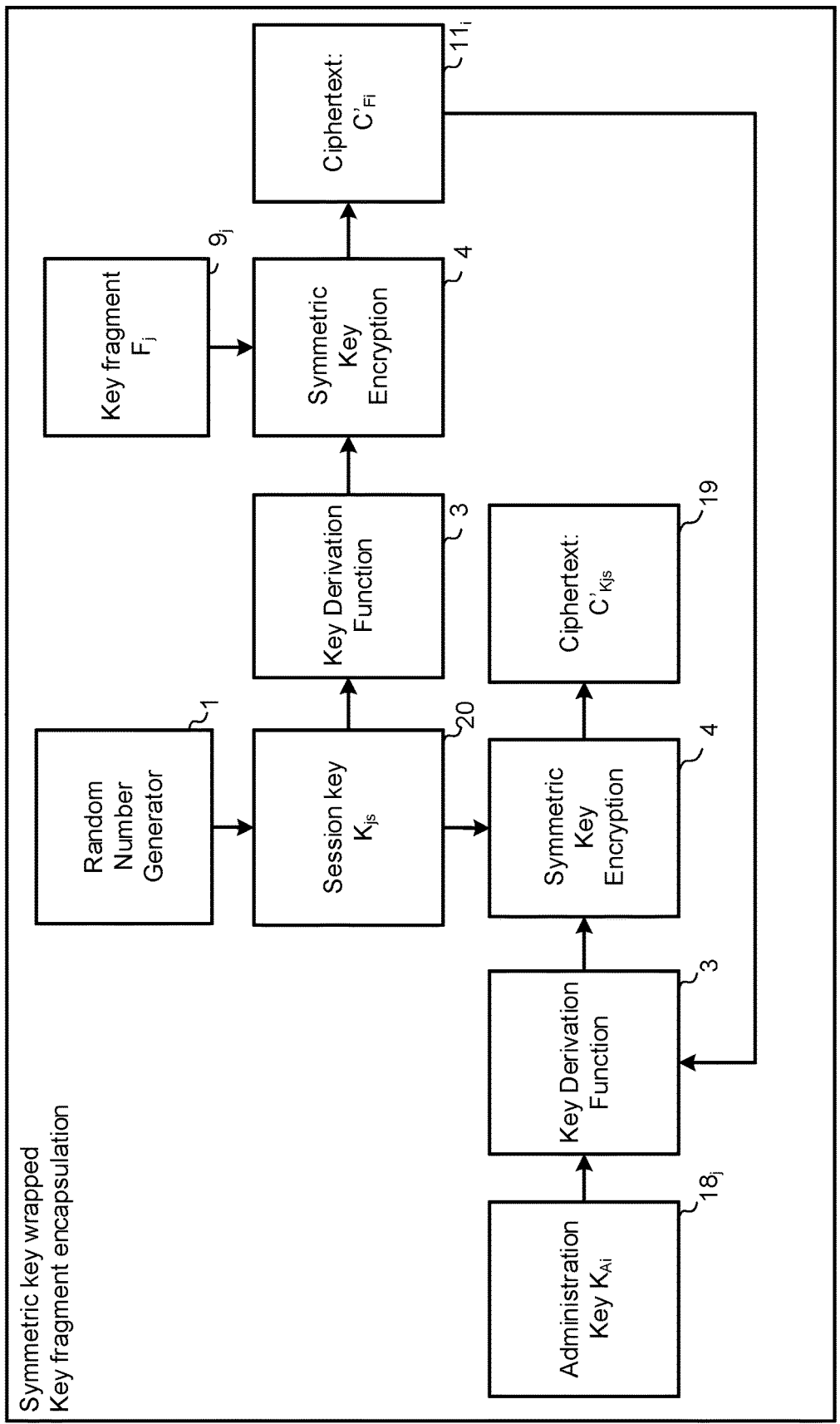
FIG. 11 is a block diagram showing the encapsulation of a key fragment using a random session key and symmetric key encryption with the session key, key wrapped by an administrator using an administration key.

With reference to FIG. 11 assuming the key fragment $F_j$ has been generated as in the first embodiment, the random number generator 1 generates the session key $K_{js}$ 20 which is input to the key derivation function 3 which provides as output the encryption key and IV to the symmetric key encryption module 4. This module 4 encrypts key fragment $F_j$ 9$_j$ to produce ciphertext $C'_{FJ}$ 11$_j$ as shown in FIG. 11.

The session key $K_{js}$ 20 is encrypted also using the symmetric key encryption module 4, as shown in FIG. 11. An administration key $K_{Aj}$ 18$_j$ is concatenated with ciphertext $C'_{Fj}$ 11$_j$ and input to the key derivation function 3 to produce the encryption key and IV in order to encrypt the session key $K_{js}$ using the symmetric key encryption module 4 producing ciphertext $C'_{Kjs}$ 19 as shown in FIG. 11. The concatenation with ciphertext $C'_{Fj}$ 11$_j$ is to ensure that administration key $K_{Aj}$ 18$_j$ may be re-used.

Normally the message ciphertext $C'_M$, and the n ciphertexts $C'_{Fj}$ j=1 to n with the n ciphertexts $C'_{Kjs}$ j=1 to n would be stored until such time that a quorum access to message M is likely to be required. At this point fragment holders may be identified and short term symmetric keys $K_{ej}$ distributed to them. The n key fragment ciphertexts and the n key wrapped ciphertexts are then distributed to fragment holders following re-encryption as shown in FIG. 12

Firstly the session key $K_{js}$ needs to be unwrapped. As shown in FIG. 12, using the Administration key $K_{Aj}$ 18$_j$ this key is concatenated with the ciphertext $C'_{Fj}$ 11$_j$ and used as input to the key derivation function 3 whose output is the decryption key and the IV needed by the symmetric key decryption module 4a. The symmetric key decryption module 4a decrypts ciphertext $C'_{Kjs}$ to produce the session key $K_{js}$, 19 assuming the authentication token check is passed. (Note the authentication token check is not shown in FIG. 12 but would be implemented as shown in FIG. 8)

Figure 12:
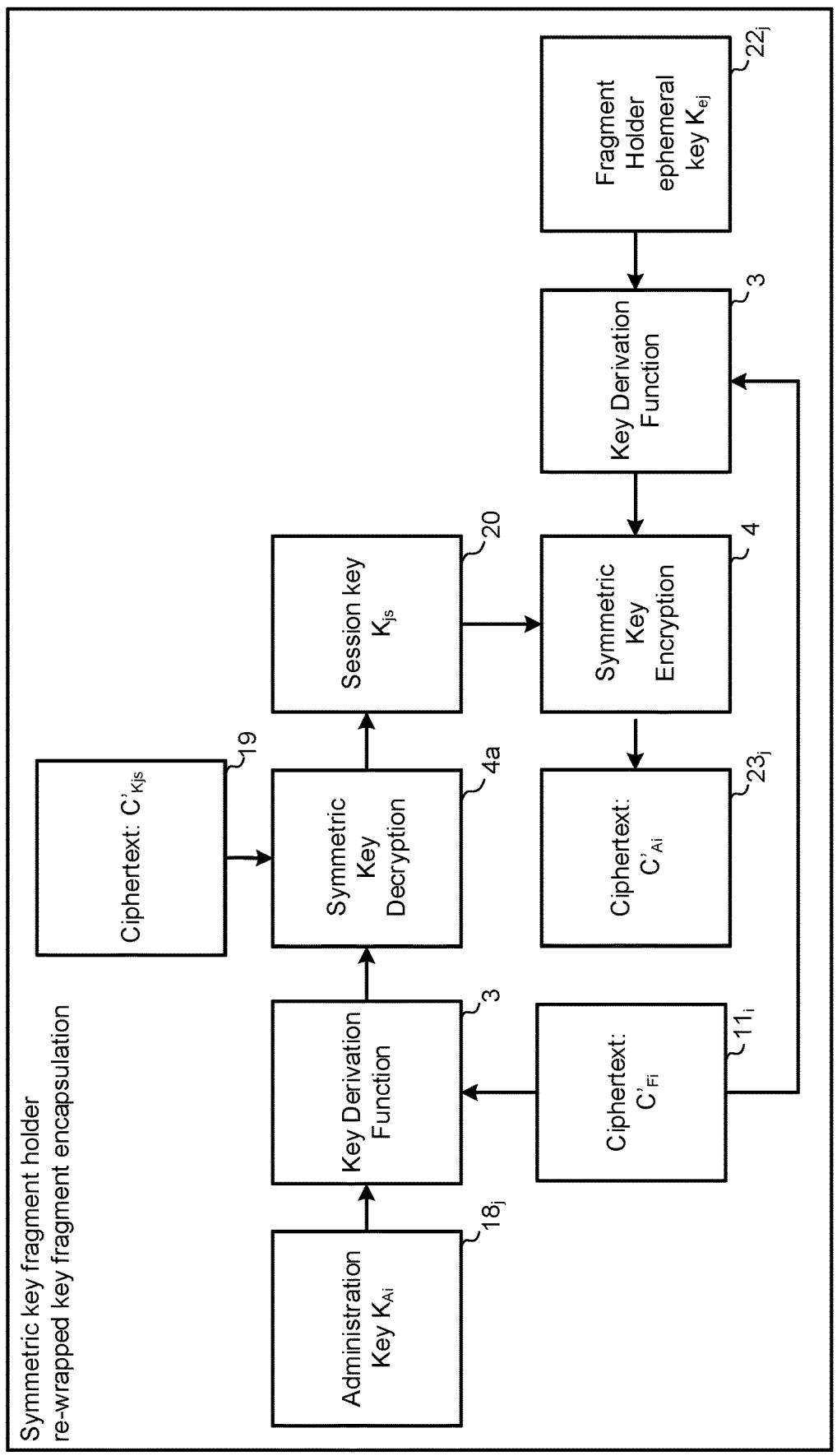
FIG. 12 is a block diagram showing the re-wrapping of a session key by an administrator in order to use an ephemeral key issued to a fragment holder.

The session key $K_{js}$, 19 is rewrapped as shown in FIG. 12 using a newly, communicated ephemeral key $K_{ej}$ for fragment holder j. The ephemeral key $K_{ej}$ is concatenated with ciphertext $C'_{Fj}$ for added security in case of ephemeral key re-use and input to the key derivation function 3 which produces as output the IV and encryption key for the symmetric key encryption module 4. This module encrypts the session key $K_{js}$ 20 to produce the ciphertext $C'_{Aj}$ which is communicated to fragment holder j. This procedure is carried out for each of the n fragment holders.

Figure 13:
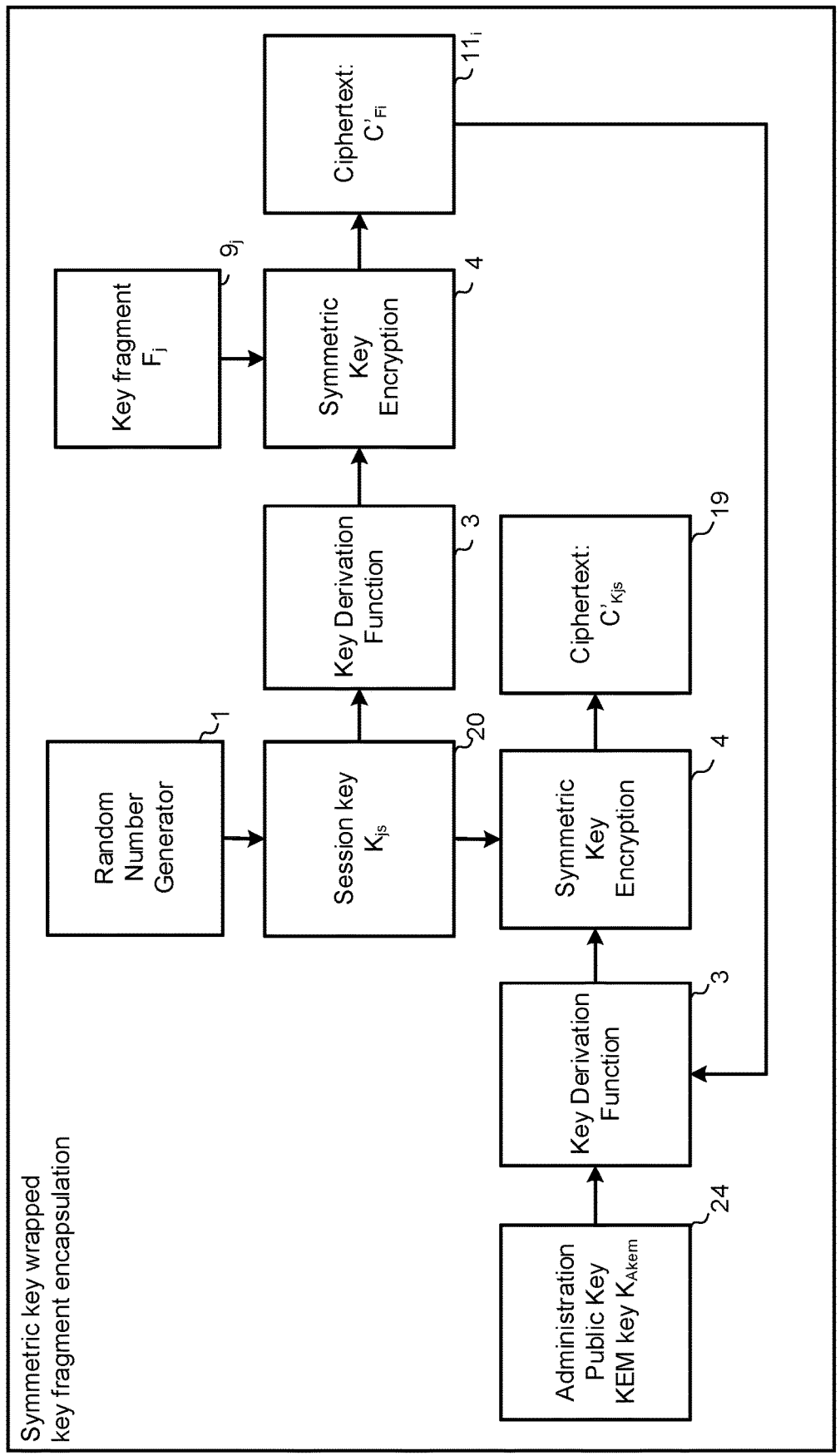
FIG. 13 is a block diagram showing an administrator's KEM key being used in encapsulation of a key fragment.

It will be appreciated that in other embodiments the Administrator(s) could use a public key KEM based cryptosystem instead of storing Administrator symmetric keys. For this case the encryption arrangement is shown in FIG. 13. Using the Administrator's public key a KEM key $K_{Akem}$ is encapsulated and used to encrypt session key $K_{js}$ as shown in FIG. 13 The session key is used to encrypt key fragment Fj to produce ciphertext $C'_{Fj}$ as described for earlier embodiments.

In the worked examples above it has been shown that a quorum can produce the session key the value of the key polynomial $f(x=x_0)$ and a check on the key fragment $x_1$ by producing $f(x=x_1)$. The quorum can produce the value of the key polynomial for any value of the variable x and hence can expand the value of n in a k out of n quorum system. For a quorum of k=3 system a new key fragment $F_\alpha$ is equal to $f(x=x_\alpha)$ which is given by $$f(x_\alpha) = \Delta_\alpha(x_2, x_3)_1 \cdot f(x_1) + \Delta_\alpha(x_1, x_3)_2 \cdot f(x_2) + \Delta_\alpha(x_1, x_2)_3 \cdot f(x_3) \quad (5)$$

It can be seen that the new key fragment is produced by the sum of three weighted key fragments using appropriate weighting factors.

Figure 14:
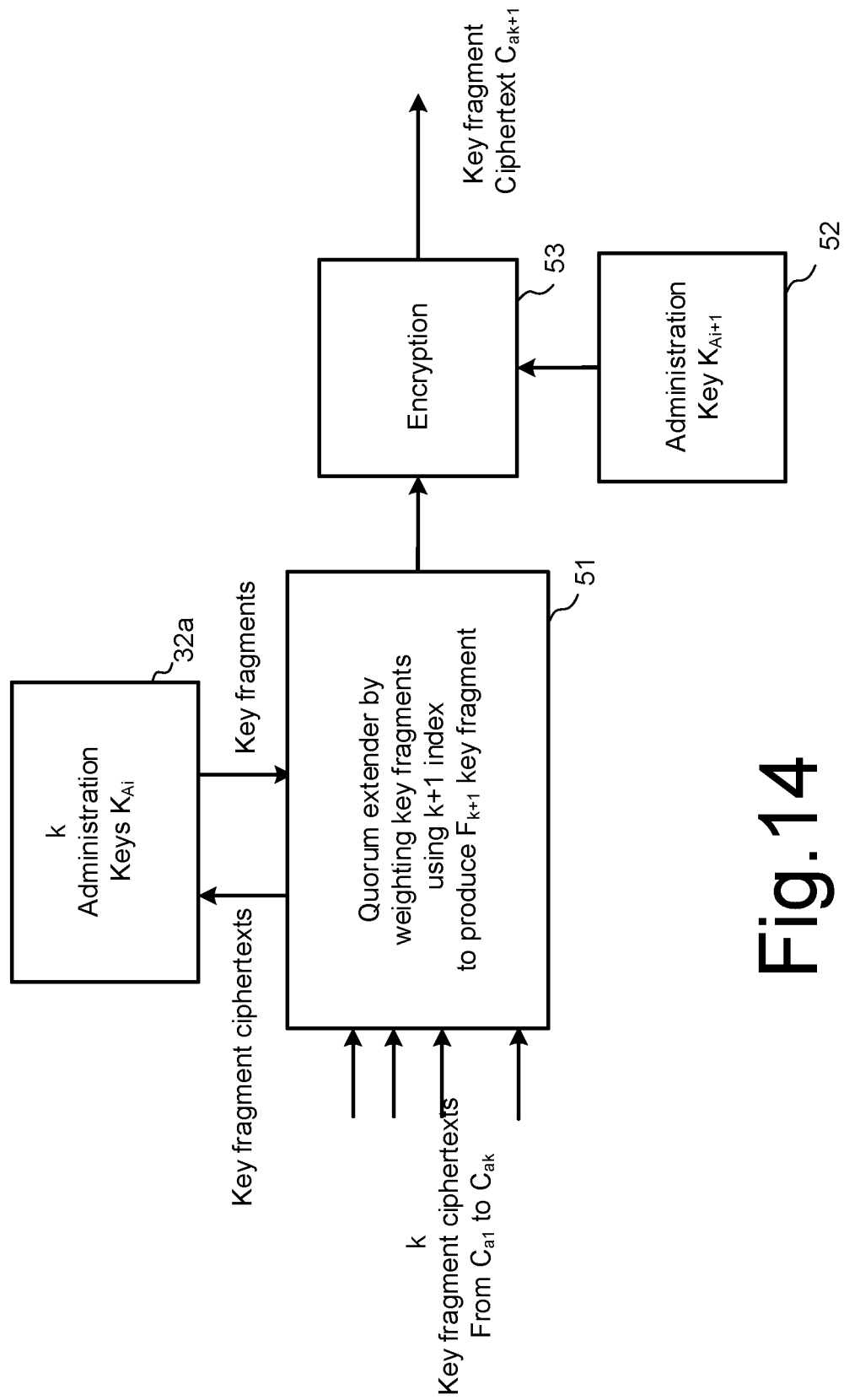
FIG. 14 is a block diagram showing how a new key fragment may be generated and encrypted into a new key fragment ciphertext by a quorum formed using administrator keys.

With this possible expansion of n in mind a different approach to generating all of the key fragments for the quorum may be adopted. When forming a new quorum, an information file is encrypted using a new session key derived from a new, randomly generated key polynomial of degree k−1 and a minimal number k key fragments are generated from the key polynomial and encrypted using k administration keys into k ciphertexts $C_{a1}$ to $C_{ak}$ as shown in FIG. 14. Having done this, the key fragments and key polynomial are deleted. At this point a k out of k minimal quorum system has been generated ready for expansion into a k out of n quorum system where n>k. As shown in FIG. 14 for a new index $x_{k+1}$ the quorum extender can produce the new key fragment $f(x_\alpha = x_{k-1}) = F_{k-1}$ by implementing equation (5) above. Using the administration key $K_{ak+1}$ the key fragment ciphertext $C_{ak+1}$ is produced forming a k out of k+1 quorum system. It is obvious that the procedure may be repeated to produce a k out of n quorum system for any arbitrary value of n<q−1. The idea in this approach is maximum system flexibility with fragment holders to be assigned at a later stage with the information ciphertext and minimal quorum ciphertexts, in the meantime, stored in a distributed ciphertext registry.

Figure 15:
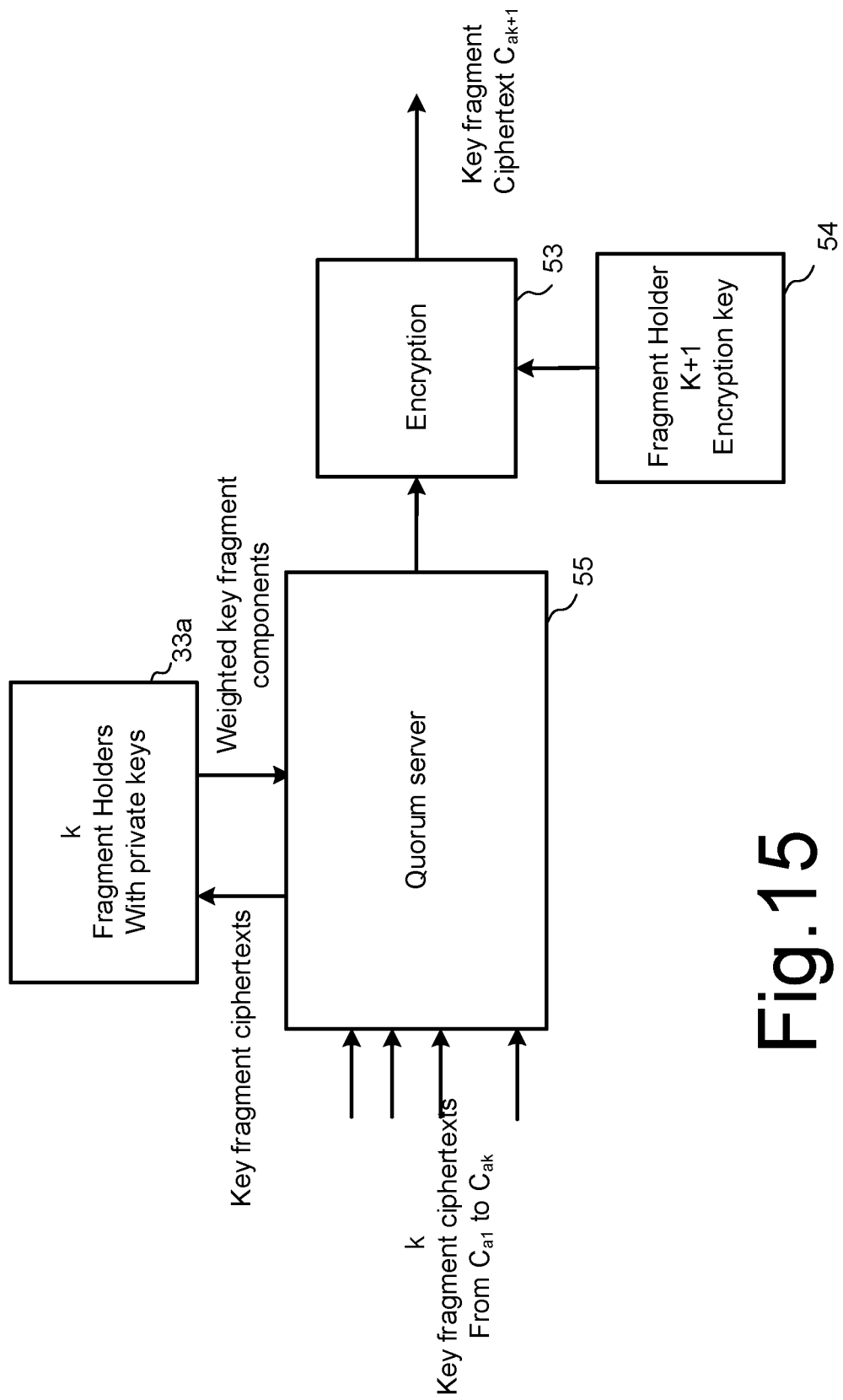
FIG. 15 is a block diagram showing how a new key fragment may be generated and encrypted into a new key fragment ciphertext by a quorum formed using fragment holders.

A similar arrangement with a minimal quorum for fragment holders is shown in FIG. 15. Here a total of k fragment holders have been assigned and identified. They have the capability to provide access to an information file which has been encrypted using a new session key derived from a new, randomly generated key polynomial of degree k−1. The corresponding k key fragments for the fragment holders are generated from the key polynomial using equation (5) above with the respective key indices (that is the assigned distinct values for the x variable) assigned to each fragment holder and encrypted using the fragment holders' public keys into k ciphertexts $C_{a1}$ to $C_{ak}$ as shown in FIG. 15. When a new key fragment needs to be generated for a new fragment holder, each fragment holder uses their private key to access their key fragment which they weight by multiplying by the appropriate factor, $\Delta_{k+1}(x_1, x_2 \ldots x_h)_k$ before sending to the quorum server 55 shown in FIG. 15. The quorum server adds together the weighted key fragments and encrypts the result using encryption module 53 with the public key of fragment holder k+1.

Figure 16:
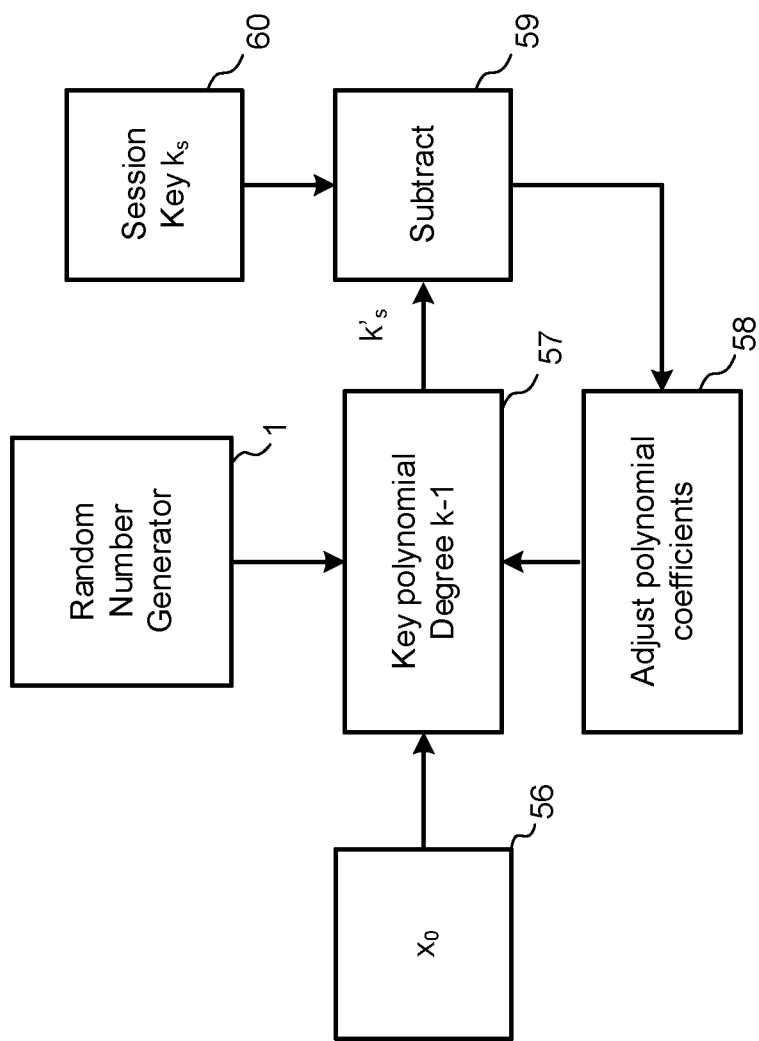
FIG. 16 is a block diagram showing how coefficients of the randomly generated quorum defining polynomial may be adjusted so as to produce a session key with a given value.

In the embodiments above the session key, used to encrypt the information file, is generated randomly from the randomly chosen key polynomial of degree k−1. In some applications, for example where the information ciphertext already exists the key polynomial f(x) needs to be generated such that $f(x=x_0) = K_s$. An arrangement for doing this is shown in FIG. 16. Considering in a worked example the key polynomial:

$$f(x) = 8273607652828276542985625 + 33616611838507402241796072311968494914 5x + 5297771526519832517629878272x^2$$

The session key $K'_s$ is $f(x=x_0=67) = 26507149149518898345299983515481404956$ If it is desired that $K_s$ should be equal to 12749904413820007817985521232807792518 6 then as shown in FIG. 16 one or more of the coefficients of f(x) may be adjusted by subtracting 59 the desired session key $K_s$ 60 from K'$_s$. In this example selecting the $x^2$ coefficient for adjustment:

f(67)+offset.

$67^2$=127499044138200078179855212328077925186

And it is found that an offset of 48991624175966791841651715667127391628 should be added to the $x^2$ coefficient of f(x) with the key polynomial becoming:

$$f(x)=8273607652828276542985625+ \\ 336166118385074022417960723119684949145x+ \\ 54289395702480639501481548184757269900x^2 \qquad (6)$$

With this key polynomial it is indeed found that the session key is changed to the required session key with f(67)=127499044138200078179855212328077925186

It is good security practice to periodically update the key fragments. Besides this best practice there is also the consideration that, over time, the fragment holders are likely to change due to reorganisation, leaving or becoming ill and a means is needed to render old key fragments obsolete with their replacement by new key fragments. Usually it is considered unnecessary or undesirable to re-encrypt the information ciphertext since this will involve reproduction of the plaintext as an intermediate step and a potential security risk.

Figure 17:
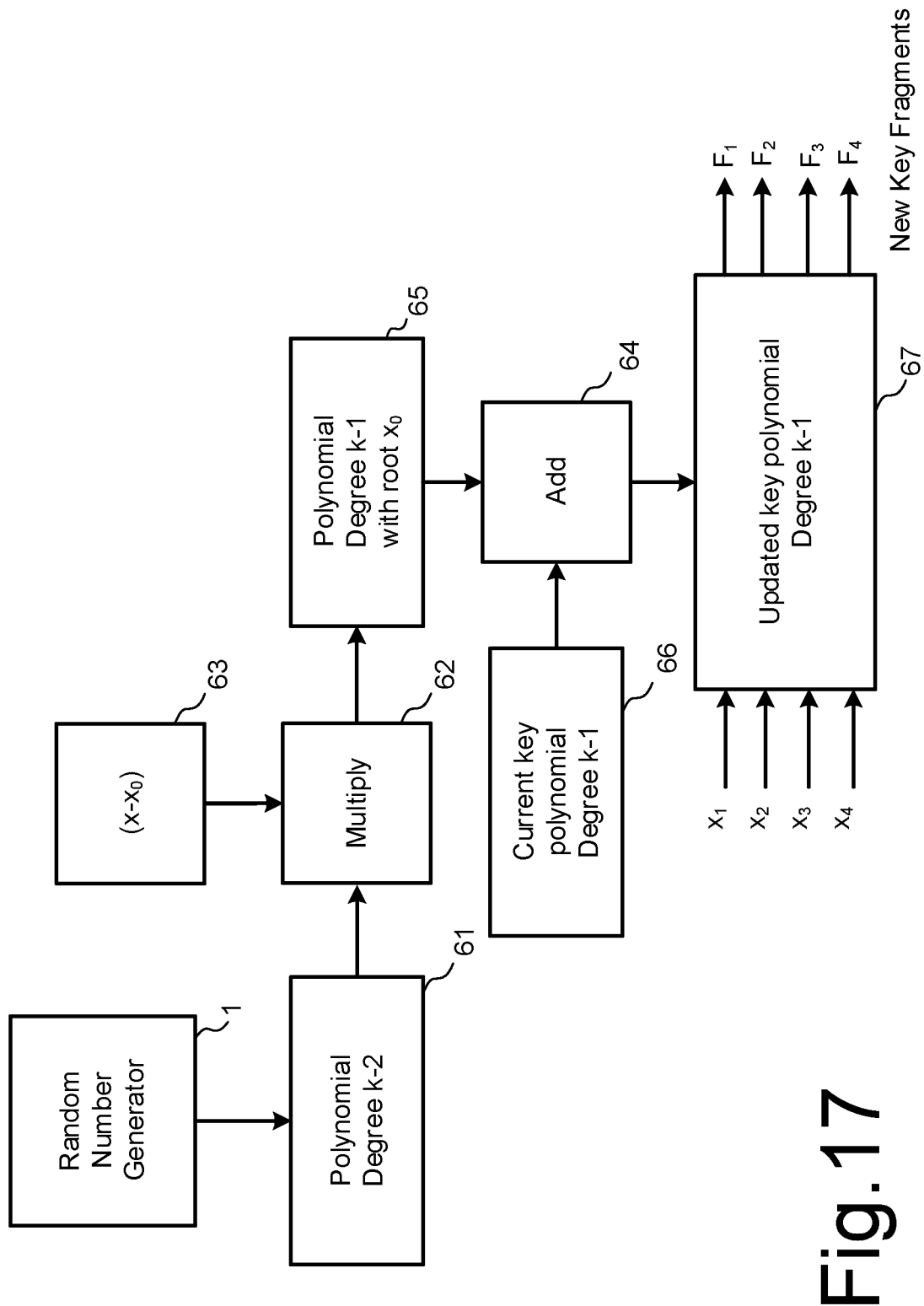
FIG. 17 is a block diagram showing how new key fragments may be derived such that the session key is unchanged.

The key fragment updating arrangement is shown in FIG. 17 which produces a complete set of new key fragments without changing the session key f(x=$x_0$). A polynomial of degree k−2 61 is produced with random coefficients using the output of the random number generator 1. This polynomial 61 is multiplied using polynomial multiplication 62 with a polynomial factor (x −$x_0$) 63 producing a polynomial 65 of degree k−1. This polynomial is termed g(x) and has a root of $x_0$ and is added to the current key polynomial f(x) to produce the updated key polynomial 67 $\hat{f}(x)$=f(x)+g(x). Evaluating the updated key polynomial 67 at indices $x_i$ for i=1 to 4 produces the new key fragments Fi=$\hat{f}(x_i)$ for i=1 to 4 as shown in FIG. 17.

Following the worked example, a polynomial g(x) constructed in this way with a root of $x_0$=67 is:

$$g(x)=8756793947074906789793900670748895329+ \\ 322947309218992148701368038428374504847x+ \\ 77483094858213326453874665002345385776x^2$$

As a check it is found that g(67)=0. Adding g(x) to the key polynomial f(x) above (6) produces:

$$\hat{f}(x)=876506760236031891745538742247291880954+ \\ 318831060683127707655954154116291242695x+ \\ 131772490560693965955356213187 \\ 102655676x^2$$

As a check it is found that the session key $\hat{f}(67)$ is unchanged with $\hat{f}(67)$=12749904413820007817985521232328077925186 However all of the key fragment values have been changed.

Figure 18:
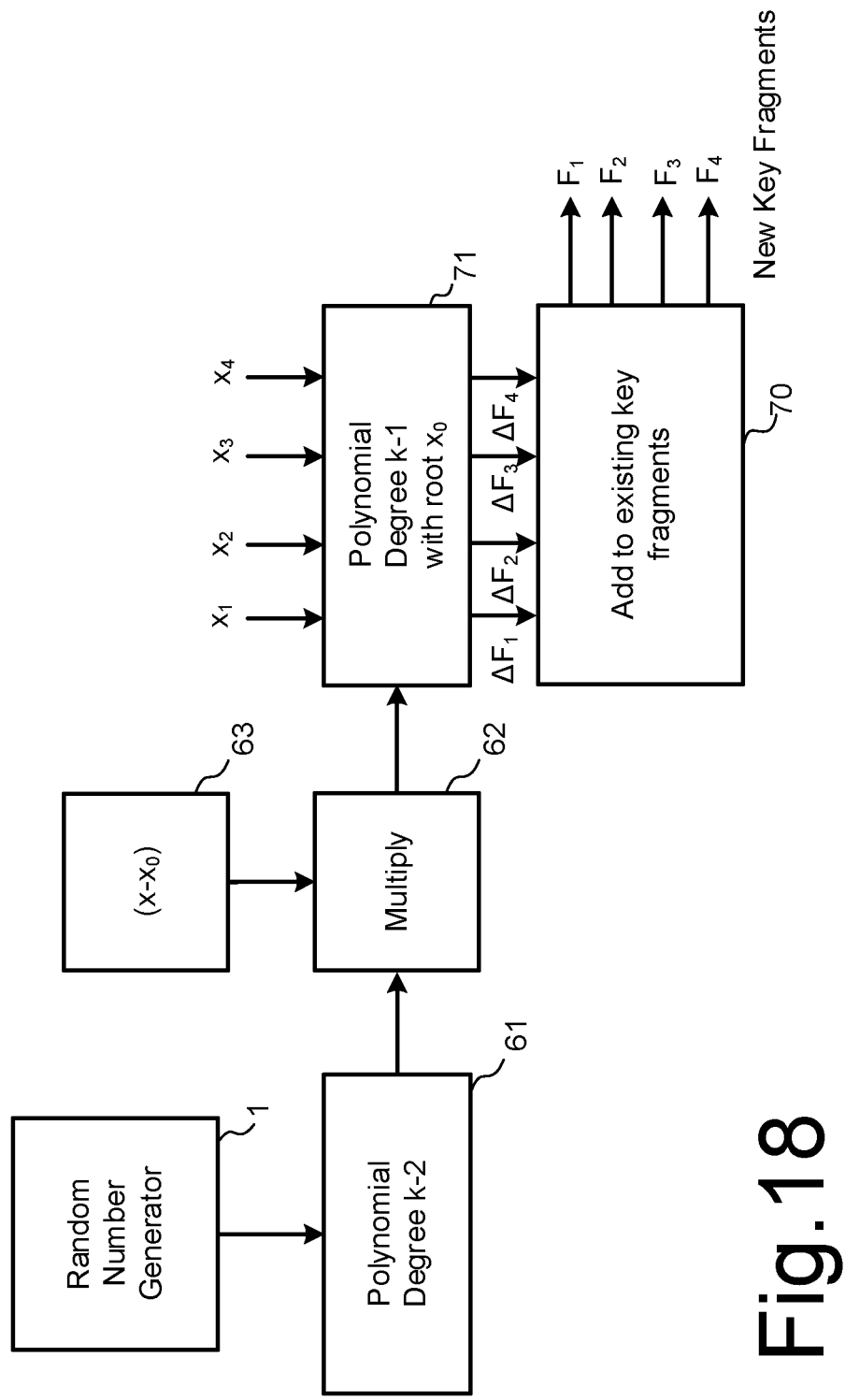
FIG. 18 is a block diagram showing how new key fragments may be derived from old key fragments and key fragment updates such that the session key is unchanged.

In the above procedure it is rather inconvenient to have to reproduce the current key polynomial f(x) since a quorum of fragment holders will be needed. An alternative arrangement is shown in FIG. 18. In this arrangement key fragment updates are generated which are added to existing key fragments to produce the new key fragments. With the new key polynomial being $\hat{f}(x)$=f(x)+g(x), it follows that a new key fragment $\hat{f}(x_i)$ is equal to f($x_i$)+g($x_i$), which is the old key fragment plus an update to the key fragment. As shown in FIG. 18 the polynomial g(x). 71 with random coefficients and with a root at $x_0$ is generated as before. Updates to the key fragments $\Delta F_i$=g($x_i$) are produced 71 by evaluating g(x). at x=$x_1$ through to $x_4$ in this example shown in FIG. 18. These updates are added to the existing key fragments 70 to produce the new key fragments. In practice the key fragment updates would be available on a server, encrypted using each fragment holder's public key with the fragment holder accessing the server and updating their key fragment.

When the polynomial g(x) has degree k'−1 where k' is greater than k, the quorum size is increased to k' and k' fragment holders will be necessary to form a quorum to reconstruct the session key. Accordingly the arrangements shown in FIGS. 17 and 18, but with g(x) having increased degree, may be used to increase the quorum size without altering the session key value.

The overhead of key fragments stored as ciphertexts is not significant, even when using post-quantum, public key KEM, key wrapping. Consider the embodiment shown in FIG. 10 using a lattice based KEM with 256 bit AES-GCM encryption keys, and as an example consider a quorum 5 out of 10 system. There are a total of 10 ciphertexts $C_{Fj}$ for j=1 to 10 and each AES-GCM ciphertext is 48 bytes long. Considering the post-quantum, worked example described above, each post-quantum KEM ciphertext $C_j$ is around 1350 bytes long so the total overhead due to the ciphertext based quorum system is 10. (1350+48) bytes which is approximately 14 kB. The information ciphertext is marginally longer than the information file itself, requiring an additional 16 bytes for the authentication token. Information files are typically several MB long. Requiring an additional 14 kB for the quorum ciphertexts is not a significant overhead. Of course, this is not always the case and for very short messages the overhead can be significant.

Example Computer System Implementation

Figure 19:
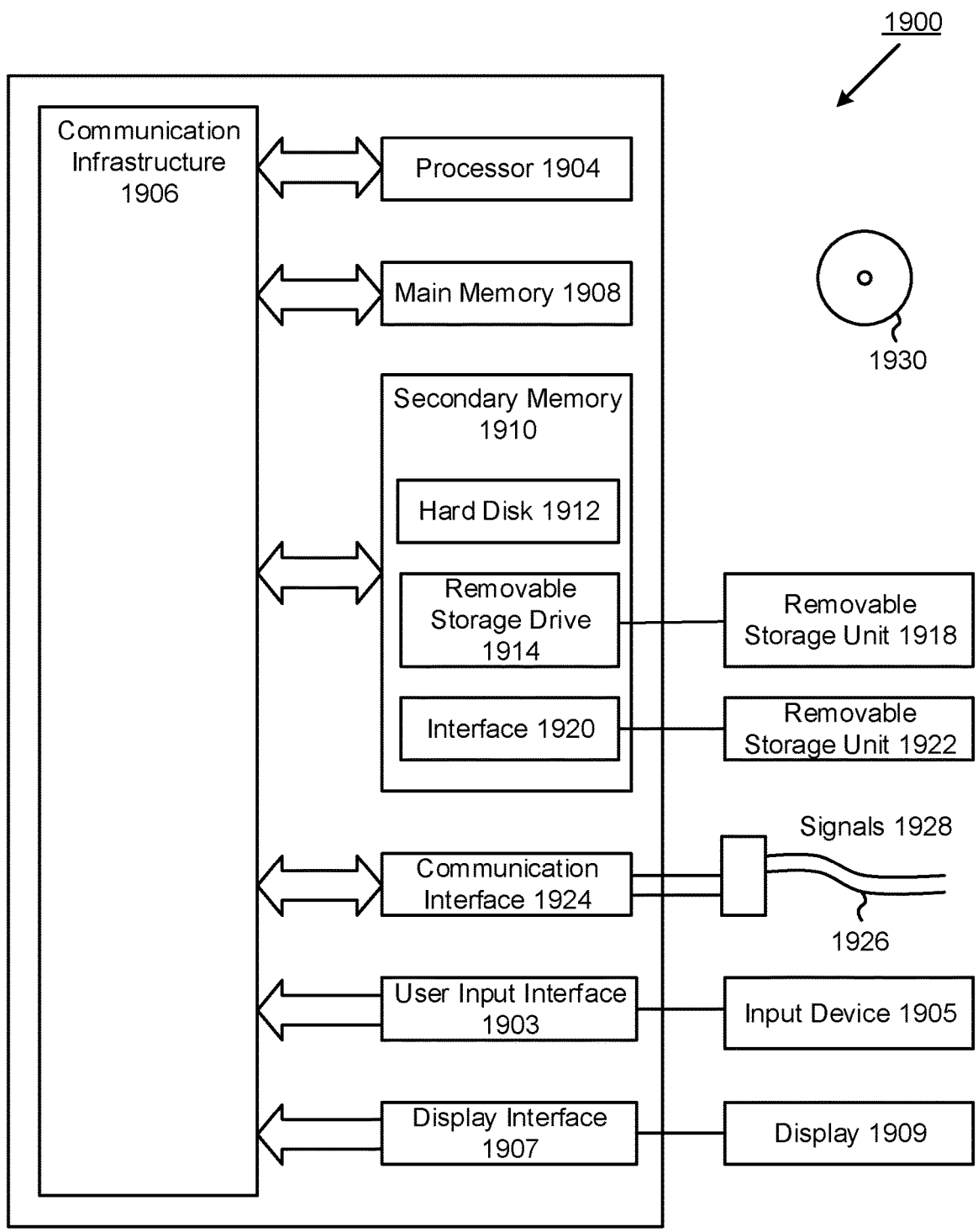
FIG. 19 is a diagram of an exemplary computer system on which one or more of the functions of the described embodiments may be implemented.

FIG. 19 illustrates an example computer system 1900 in which the present invention, or portions thereof, can be implemented as computer-readable code to program processing components of the computer system 1900. Various embodiments of the invention are described in terms of this example computer system 1900. For example, the quorum-based data processing systems and modules schematically illustrated in the figures discussed above can be implemented in one or more such systems 1900. After reading this description, it will become apparent to a person skilled in the relevant art how to implement the invention using other computer systems and/or computer architectures.

Computer system 1900 includes one or more processors, such as processor 1904. Processor 1904 can be a special purpose or a general-purpose processor. Processor 1904 is connected to a communication infrastructure 1906 (for example, a bus, or network). Computer system 1900 may include a user input interface 1903 connected to one or more input device(s) 1905 and a display interface 1907 connected to one or more display(s) 1909, which may be integrated input and display components. Input devices 1905 may include, for example, a pointing device such as a mouse or touchpad, a keyboard, a touchscreen such as a resistive or capacitive touchscreen, etc.

Computer system 1900 also includes a main memory 1908, preferably random access memory (RAM), and may also include a secondary memory 1910. Secondary memory 1910 may include, for example, a hard disk drive 1912, a removable storage drive 1914, flash memory, a memory stick, and/or any similar non-volatile storage mechanism. Removable storage drive 1914 may comprise a floppy disk drive, a magnetic tape drive, an optical disk drive, a flash memory, or the like. The removable storage drive 1914 reads from and/or writes to a removable storage unit 1918 in a well-known manner. Removable storage unit 1918 may comprise a floppy disk, magnetic tape, optical disk, etc. which is read by and written to by removable storage drive

1914. As will be appreciated by persons skilled in the relevant art(s), removable storage unit 1918 includes a non-transitory computer usable storage medium having stored therein computer software and/or data.

In alternative implementations, secondary memory 1910 may include other similar means for allowing computer programs or other instructions to be loaded into computer system 1900. Such means may include, for example, a removable storage unit 1922 and an interface 1920. Examples of such means may include a program cartridge and cartridge interface (such as that found in video game devices), a removable memory chip (such as an EPROM, or PROM) and associated socket, and other removable storage units 1922 and interfaces 1920 which allow software and data to be transferred from the removable storage unit 1922 to computer system 1900.

Computer system 1900 may also include a communications interface 1924. Communications interface 1924 allows software and data to be transferred between computer system 1900 and external devices. Communications interface 1924 may include a modem, a network interface (such as an Ethernet card), a communications port, a PCMCIA slot and card, or the like.

Various aspects of the present invention can be implemented by software and/or firmware (also called computer programs, instructions or computer control logic) to program programmable hardware, or hardware including special-purpose hardwired circuits such as application-specific integrated circuits (ASICs), programmable logic devices (PLDs), field-programmable gate arrays (FPGAs), etc. of the computer system 1900, or a combination thereof. Computer programs for use in implementing the techniques introduced here may be stored on a machine-readable storage medium and may be executed by one or more general-purpose or special-purpose programmable microprocessors. The terms "computer program medium", "non-transitory computer readable medium" and "computer usable medium" introduced herein can generally refer to media such as removable storage unit 1918, removable storage unit 1922, and a hard disk installed in hard disk drive 1912. Computer program medium, computer readable storage medium, and computer usable medium can also refer to memories, such as main memory 1908 and secondary memory 1910, which can be memory semiconductors (e.g. DRAMs, etc.). These computer program products are means for providing software to computer system 1900.

Computer programs are stored in main memory 1908 and/or secondary memory 1910. Computer programs may also be received via communications interface 1924. Such computer programs, when executed, enable computer system 1900 to implement the present invention as described herein. In particular, the computer programs, when executed, enable processor 1904 to implement the encryption and/or decryption processes of the present invention, as described above. Accordingly, such computer programs represent controllers of the computer system 1900. Where the invention is implemented using software, the software may be stored in a computer program product and loaded into computer system 1900 using removable storage drive 1914, interface 1920, hard drive 1912, or communications interface 1924.

Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

Alternatives and Modifications

It will be understood that embodiments of the present invention are described herein by way of example only, and that various changes and modifications may be made without departing from the scope of the invention.

For example, it will be appreciated that although respective processes and associated processing modules may be described above as separate embodiments, aspects of the described embodiments can be combined to form further embodiments. For example, as those skilled in the art will appreciate, the components of the quorum processor system may be included in the quorum-based data generator system.

In the embodiments described above, encryption and decryption is based on the AES in Galois Counter Model (AES-GCM) cipher suite. As those skilled in the art will appreciate, any other suitable type of symmetric key authenticated encryption algorithm may be used. As one alternative, the Chacha20-poly1305, part of the open source cryptographic library, OpenSSL, could be used.

In some of the embodiments described above, the quorum key fragment ciphertexts are transmitted to and stored by computing devices of respective authorised users of the system. As those skilled in the art will appreciate, as an alternative, each quorum key fragment ciphertext may instead be provided in the form of an authentication token. For example, each ciphertext may be encoded and stored in a magnetic strip of a physical card, or may be encoded as a bar- or QR-code that is printed on a physical or displayed on a virtual card, or may be encoded and stored in a RFID tag.

Yet further alternative embodiments may be envisaged, which nevertheless fall within the scope of the following claims.

The invention claimed is:

1. A method of quorum-based information recovery, comprising:
   receiving a plurality of ciphertexts, including 2k out of n key fragment ciphertexts, and at least one message ciphertext that is generated by encrypting information data using a session key whose value is equal to the value of a polynomial of predetermined degree, k−1 at a distinct point, and in which the value of the polynomial evaluated at each one of n other distinct points is encrypted to produce a respective key fragment ciphertext using an encryption key which has been encrypted into a ciphertext;
   determining a reconstructed session key, wherein the step of determining the reconstructed session key comprises:
      decrypting k of the key fragment ciphertexts using respective k private decryption keys to produce k decryption keys, and
      using said k decryption keys to decrypt the k key ciphertexts which were not decrypted in the previous decryption step to produce k key fragments which are weighted and added together to reconstruct the session key; and
   using said reconstructed session key to decrypt the message ciphertext.

2. The method according to claim 1 in which the reconstructed session key is checked for accuracy by using the reconstructed session key to reconstruct a key fragment which is compared to one of the key fragments obtained by decryption of a ciphertext.

3. The method according to claim 1 in which the ciphertexts are produced using symmetric key encryption.

4. The method according to claim 3 in which the symmetric key encryption is an authenticated symmetric key encryption method using a key derivation function which generates the initial vector and symmetric key.

5. The method according to claim 1 in which some of the ciphertexts are generated using public key encryption.

6. The method according to claim 3 in which an encryption or decryption key is encapsulated by an encryption system in a key encapsulation mechanism.

7. The method according to claim 1 in which some of the ciphertexts are generated using public key encryption which is resistant to attack by a quantum computer.

8. The method according to claim 1 in which the number of ciphertexts available to fragment holders is increased by forming a quorum by determining k key fragments from k ciphertexts and summing the key fragments after multiplying each one of these by a weighting factor which is a function of k polynomial evaluation points $x_i$ for i=1 to k and a new evaluation point $x_0$ to generate a new key fragment and then encrypting the new key fragment into a new key fragment ciphertext.

9. The method as in claim 8 in which the weighting factor used for generating the new key fragment is given by:

$$\frac{\Pi_{i=1}^{k-1}(x_0 - x_i)}{\Pi_{i=1}^{k-1}(x_j - x_i)}.$$

10. The method according to claim 1 in which as an intermediate step the session key used to produce a key fragment ciphertext is key wrapped using an administration encryption key.

11. The method according to claim 10 in which the key wrapped session key is rewrapped using a fragment holder's encryption key.

12. The method according to claim 10 in which the key wrapping is achieved by using a key encapsulation mechanism.

13. The method according to claim 1 in which the polynomial of degree k−1 initially has random coefficients and in which one or more coefficients are adjusted so that the value of the polynomial at the distinct point is equal to a given session encryption key.

14. The method according to claim 1 in which new quorum key fragments are produced without changing the session key by adding a new polynomial of degree k−1 which has a root at $x_0$ to the polynomial of predetermined degree used to generate the session key at the distinct point $x_0$.

15. The method according to claim 14 in which the new quorum key fragments are produced without changing the session key by adding key fragment updates to the key fragments, the key fragment updates obtained by evaluating the polynomial of degree k−1 which has a root at $x_0$ at distinct points.

16. The method according to claim 14 in which the number of key fragments required to reconstruct the session key is increased to k' without altering the session key by increasing the degree of the new polynomial which has a root at $x_0$ to degree k'−1.

17. The method according to claim 1, wherein a new, ephemeral, session key is used for each instance of information data to be encrypted.

18. A system comprising a computer processor configured to carry out the steps of the method of claim 1.

19. A non-transitory computer-readable medium comprising computer-executable instructions that, when executed, perform the method in accordance with claim 1.

* * * * *